US012262163B2

(12) United States Patent
Farrer

(10) Patent No.: US 12,262,163 B2
(45) Date of Patent: Mar. 25, 2025

(54) AUDIO SIGNAL DRIVEN TORCH AND TORCH SYSTEM

(71) Applicant: Red Weather Systems Inc., Costa Mesa, CA (US)

(72) Inventor: Trent Farrer, Vancouver, WA (US)

(73) Assignee: RED WEATHER SYSTEMS INC., Costa Mesa, CA (US)

( * ) Notice: Subject to any disclaimer, the term of this patent is extended or adjusted under 35 U.S.C. 154(b) by 521 days.

(21) Appl. No.: 17/651,556

(22) Filed: Feb. 17, 2022

(65) Prior Publication Data

US 2022/0264207 A1 Aug. 18, 2022

Related U.S. Application Data

(60) Provisional application No. 63/150,867, filed on Feb. 18, 2021.

(51) Int. Cl.

| | |
|---|---|
| ***F23D 14/38*** | (2006.01) |
| ***F23D 14/46*** | (2006.01) |
| ***F23D 14/60*** | (2006.01) |
| ***H04R 1/02*** | (2006.01) |

(52) U.S. Cl.

CPC ............. *H04R 1/028* (2013.01); *F23D 14/38* (2013.01); *F23D 14/465* (2013.01); *F23D 14/60* (2013.01); *F23D 2208/00* (2013.01)

(58) Field of Classification Search

None

See application file for complete search history.

(56) References Cited

U.S. PATENT DOCUMENTS

| | | | | |
|---|---|---|---|---|
| D891,594 | S | 7/2020 | Farrer | |
| D893,004 | S | 8/2020 | Farrer | |
| D893,005 | S | 8/2020 | Farrer | |
| 10,746,407 | B1 * | 8/2020 | Mann | G06F 3/16 |
| 10,859,265 | B2 * | 12/2020 | Chen | F24B 1/1808 |
| 11,231,173 | B2 | 1/2022 | Mann et al. | |
| 2019/0242577 | A1 * | 8/2019 | Mann | G06F 3/167 |
| 2021/0095848 | A1 * | 4/2021 | Nair | F23N 5/16 |

OTHER PUBLICATIONS

Farrer, T., "Portable Barbeque With Audio Output," U.S. Appl. No. 29/729,618, filed Mar. 27, 2020, 7 pages.
Farrer, T., "Cooktop for Portable Apparatus," U.S. Appl. No. 29/765,740, filed Jan. 11, 2021, 8 pages.
Farrer, T., "Flame Display System and Methods," U.S. Appl. No. 17/648,801, filed Jan. 24, 2022, 44 pages.
Farrer, T., "Modular Heating Device," U.S. Appl. No. 17/651,550, filed Feb. 17, 2022, 46 pages.

* cited by examiner

*Primary Examiner* — Ko-Wei Lin
(74) *Attorney, Agent, or Firm* — McCoy Russell LLP

(57) ABSTRACT

Methods and systems for a fire device, comprising actuating a respective valve included in each of a plurality of torches based on the audio mode selection and the audio input via a control signal sent through a common line, wherein each of the plurality of torches comprises a wire connection clamp coupling a respective torch of the plurality of torches to the common line to receive the control signal. The valve is part of an ignition configuration, wherein the ignition configuration includes a fan lighter positioned vertically above the gaseous fuel injector, in at least one example.

20 Claims, 13 Drawing Sheets

AUDIO SIGNAL DRIVEN TORCH AND TORCH SYSTEM

CROSS-REFERENCE TO RELATED APPLICATION

This application claims the benefit of U.S. Provisional Application No. 63/150,867, entitled "AUDIO SIGNAL DRIVEN TORCH AND TORCH SYSTEM", filed Feb. 18, 2021. U.S. Provisional Application No. 63/150,867 is hereby incorporated by this reference.

FIELD

The present description relates generally to methods and systems for controlling a torch and torch system. The torch methods and systems disclosed herein may include one or a plurality of torches. Further, in at least one example, the torch system may further include additional fire display devices, such as one or more fire pits.

BACKGROUND/SUMMARY

A torch is a fire device that may serve as décor and lighting. In large spaces, it is often desirable to have multiple torches and, in some cases, one or more additional fire devices such as fire pits on display. Such fire devices may be coordinated with an input, such as an audio input, to provide bursts of flame for an entertaining and theatrical effect. However, there are challenges to creating such fire displays with multiple fire devices. For example, it may be difficult to coordinate fire bursts of the fire devices to an audio input and with each other. There are further challenges in forming a flame that is easily seen from a distance. Furthermore, there may be installation challenges as to wiring, especially in cases where the fire display is outdoors.

In one example, the issues described above may be addressed by methods and systems for actuating a respective valve included in each of a plurality of fire devices via a control signal sent through a common line. In at least one example, each of the fire devices comprises a wire connection clamp coupling a fire device to the common line to receive the control signal. The fire devices may comprise a fan lighter that is provided vertically above a gaseous fuel injector that receives gaseous fuel via the valve, where the gaseous fuel injector may provide a gaseous fuel stream at greater than a threshold rate.

In this way, the plurality of fire devices, such as torches, may be controlled and installed in a simple manner while providing a fire display that is easily viewable. For example, the common line connecting the plurality of fire devices simplifies a process for coordinating the fire devices with each other as well as with an audio input, if being operated in an audio mode. The wire connection clamps for coupling the fire devices to the common line additionally provides a highly adaptable and flexible approach for positioning the plurality of fire devices. Moreover, by an ignition configuration in which the fan lighter is provided vertically above a gaseous fuel injector, the inventors have found that the resulting flames may have a floating effect that is easier to view. This floating effect, also referred to as a ghost flame effect, also helps to emphasize coordination of flames with an audio input, when operated in an audio mode.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
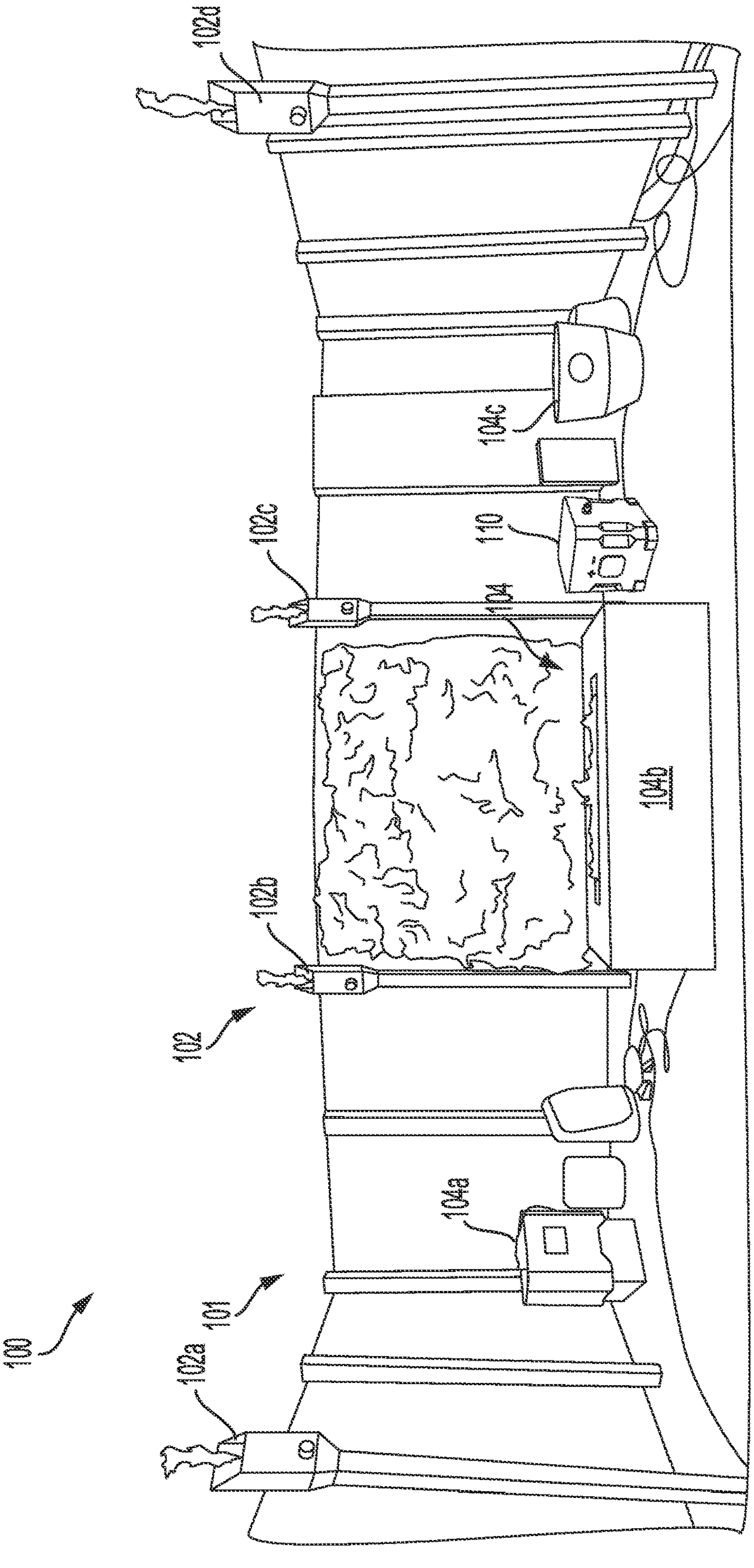
FIG. 1 shows a system environment, according to one or more examples of the present disclosure.
Figure 2A:
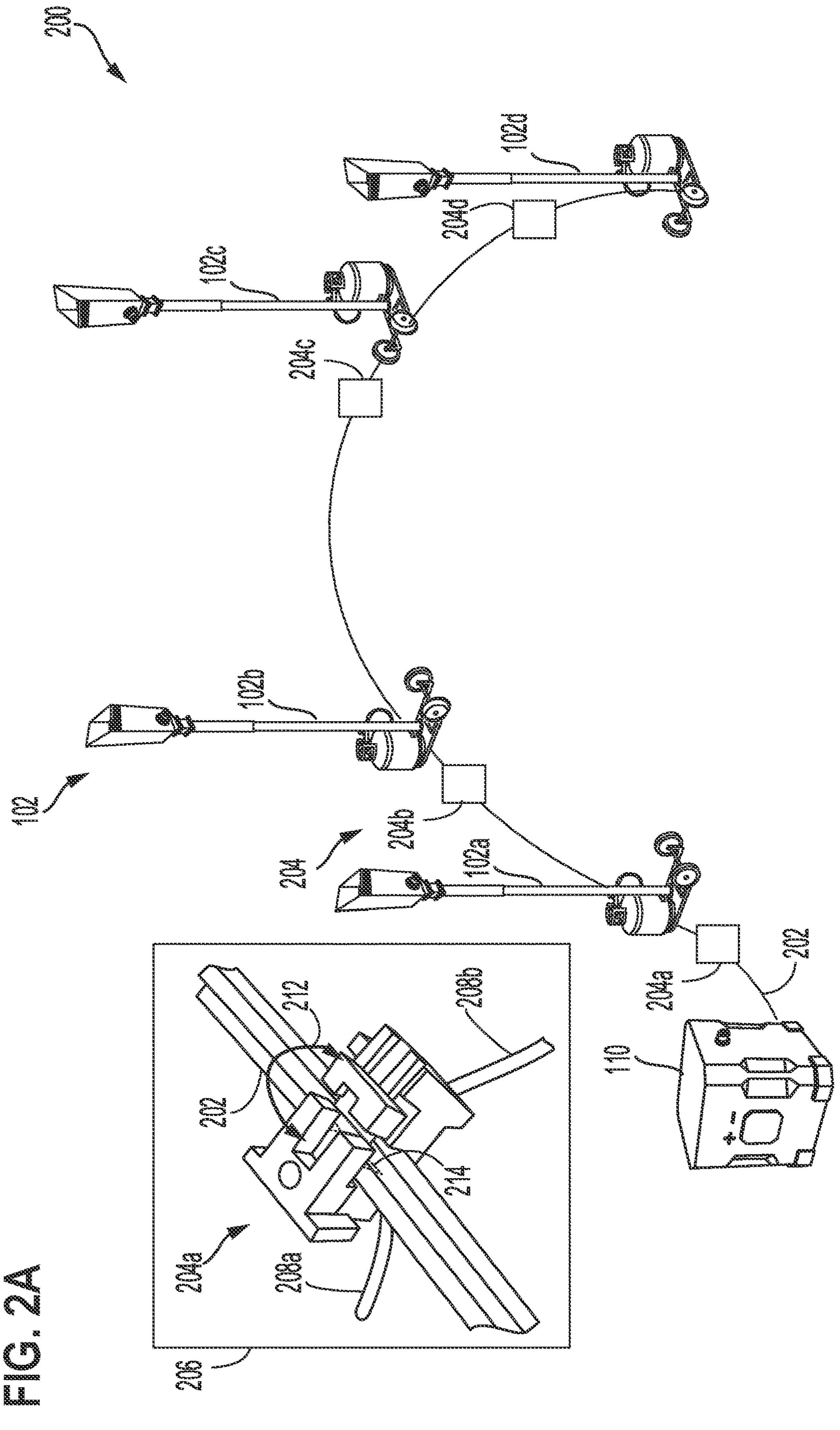
FIG. 2A is a first schematic system connectivity map, according to one or more examples of the present disclosure.
Figure 2B:
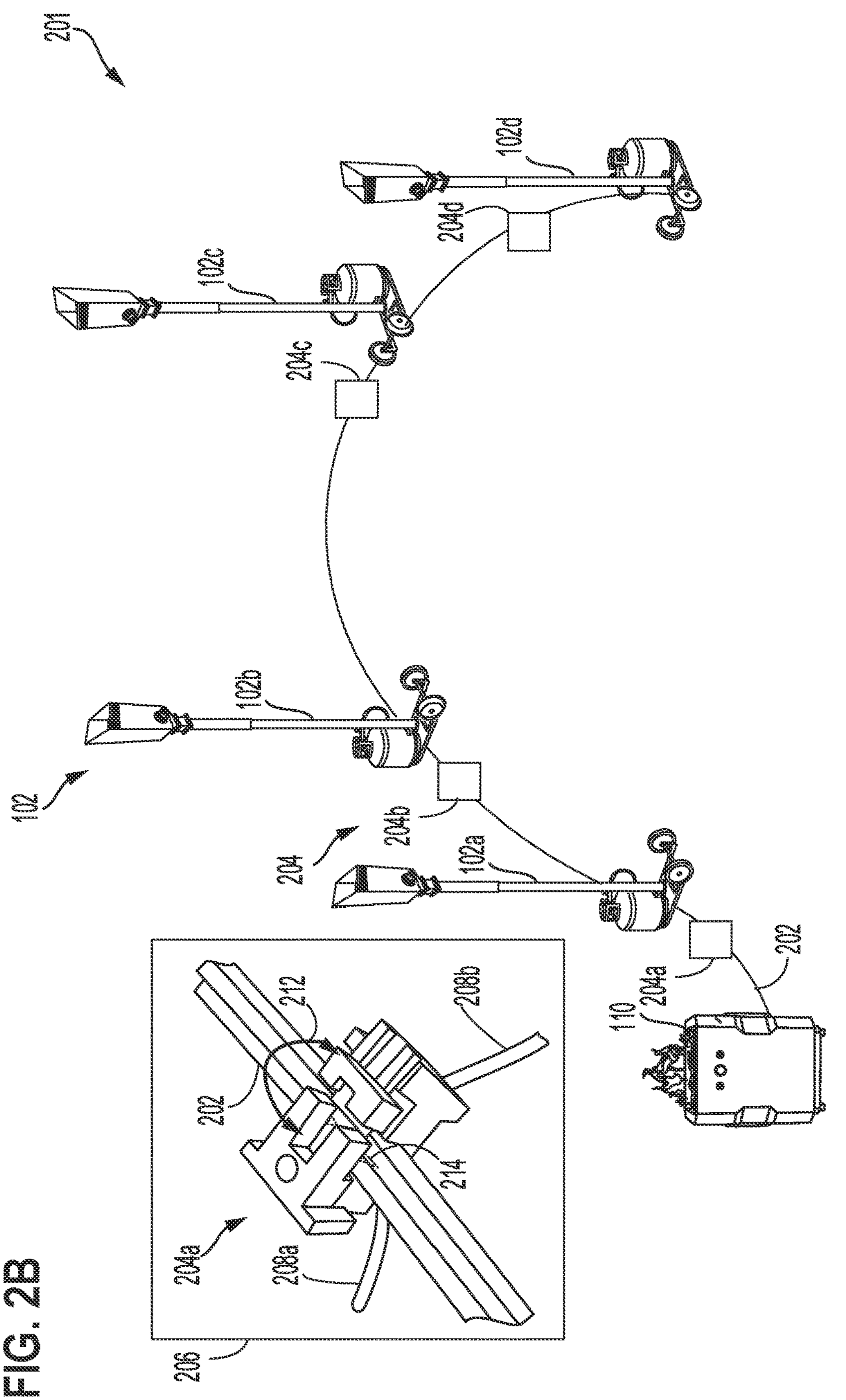
FIG. 2B is a second schematic system connectivity map, according to one or more examples of the present disclosure.
Figure 2C:
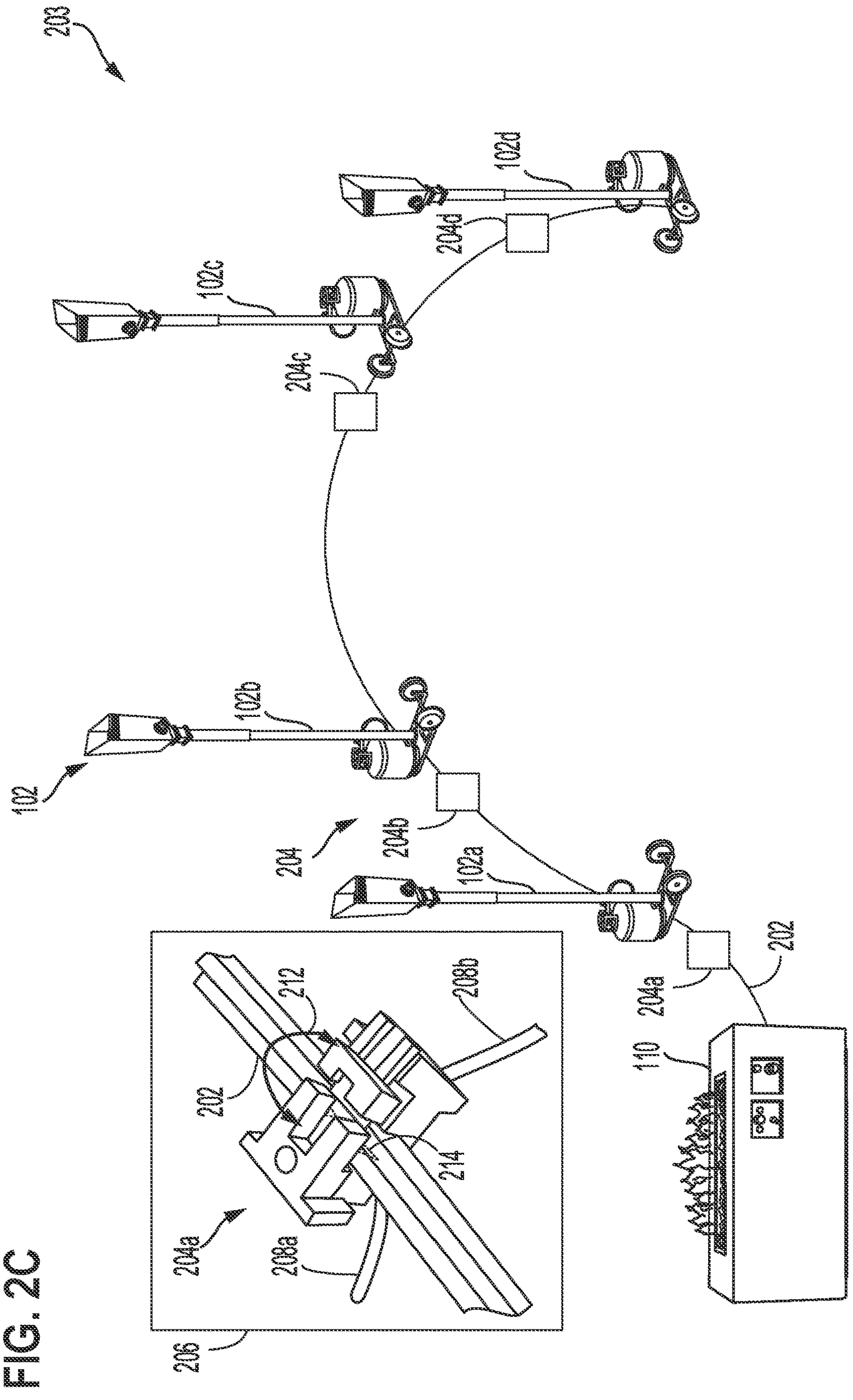
FIG. 2C is a third schematic system connectivity map, according to one or more examples of the present disclosure.

The following description relates to systems and methods for a fire device and fire device system, including methods for a torch and a torch system. The fire device system may comprise multiple fire devices to form a fire display, as shown in the system environment of FIG. 1. As seen in FIG. 1, the fire devices may include one or more torches and fire pits controlled via a hub. Various torch configurations have been contemplated, such as the example torches discussed at FIGS. 3A-3B and FIGS. 4A-4B. Various hub configurations have also been contemplated. For example, the hub may be a standalone hub, such as shown at FIG. 2A, FIGS. 8A-8B, and FIG. 9. In other examples, the hub may be integrated into a fire device, such as a fire pit, as illustrated at FIGS. 2B-2C. In contrast to a torch, it is noted that a fire pit may have a relatively shorter base. The hub may comprise speakers and a controller configuration to signal the fire devices, as described at FIG. 9.

The hub and one or more fire devices may be coupled to a common control line, and the hub may provide control signals to such fire devices via the common control line. For example, one or more torches of a fire display may be coupled to the common control line via wire connection clamps, as shown at FIGS. 2A-2C. By coupling the fire devices to the common line as shown in FIGS. 2A-2C, a flexibility in positioning the fire devices may be improved, making installation simple.

Figure 5:
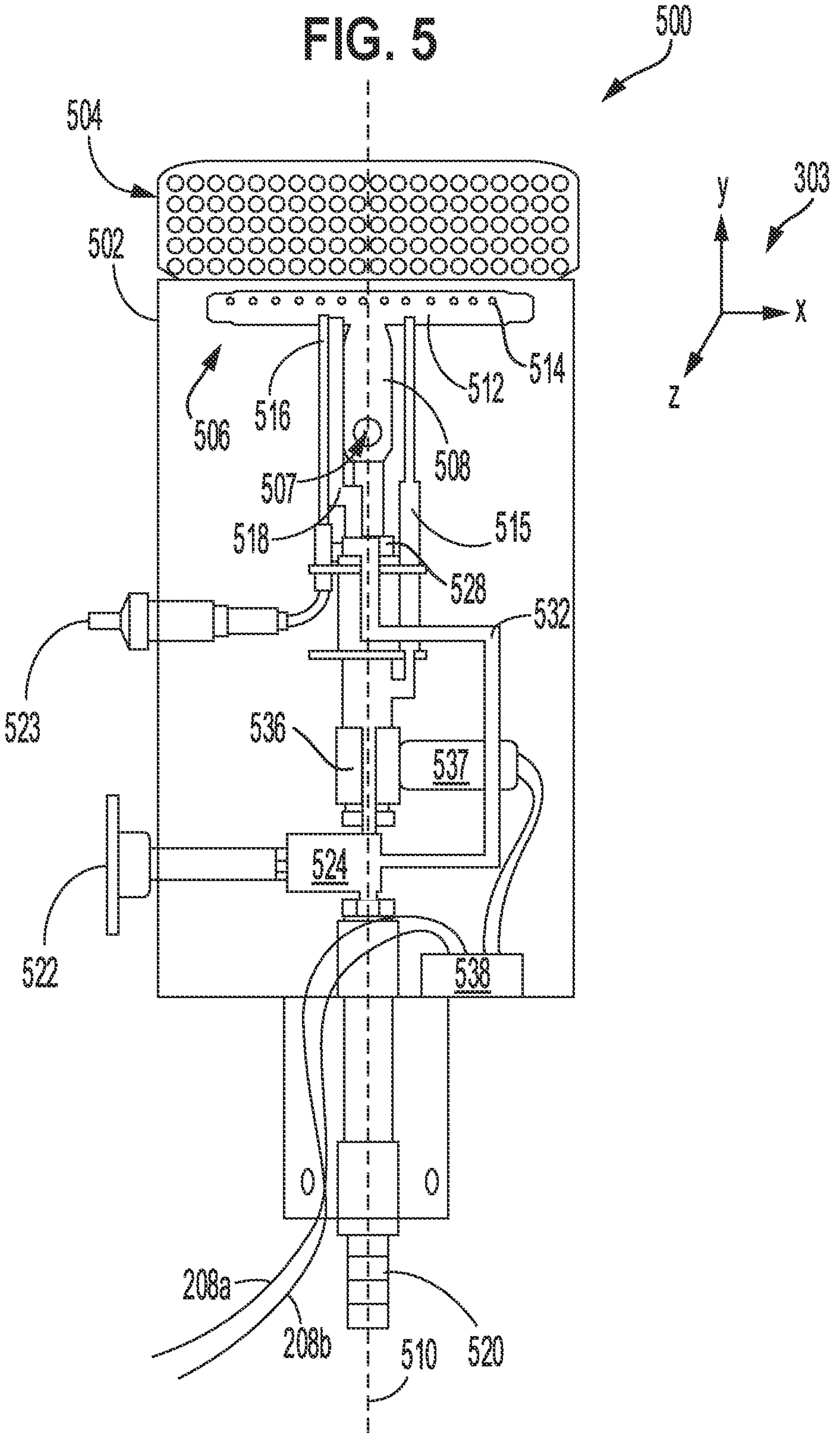
FIG. 5 is a schematic diagram of an ignition configuration, according to one or more examples of the present disclosure.
Figure 6:
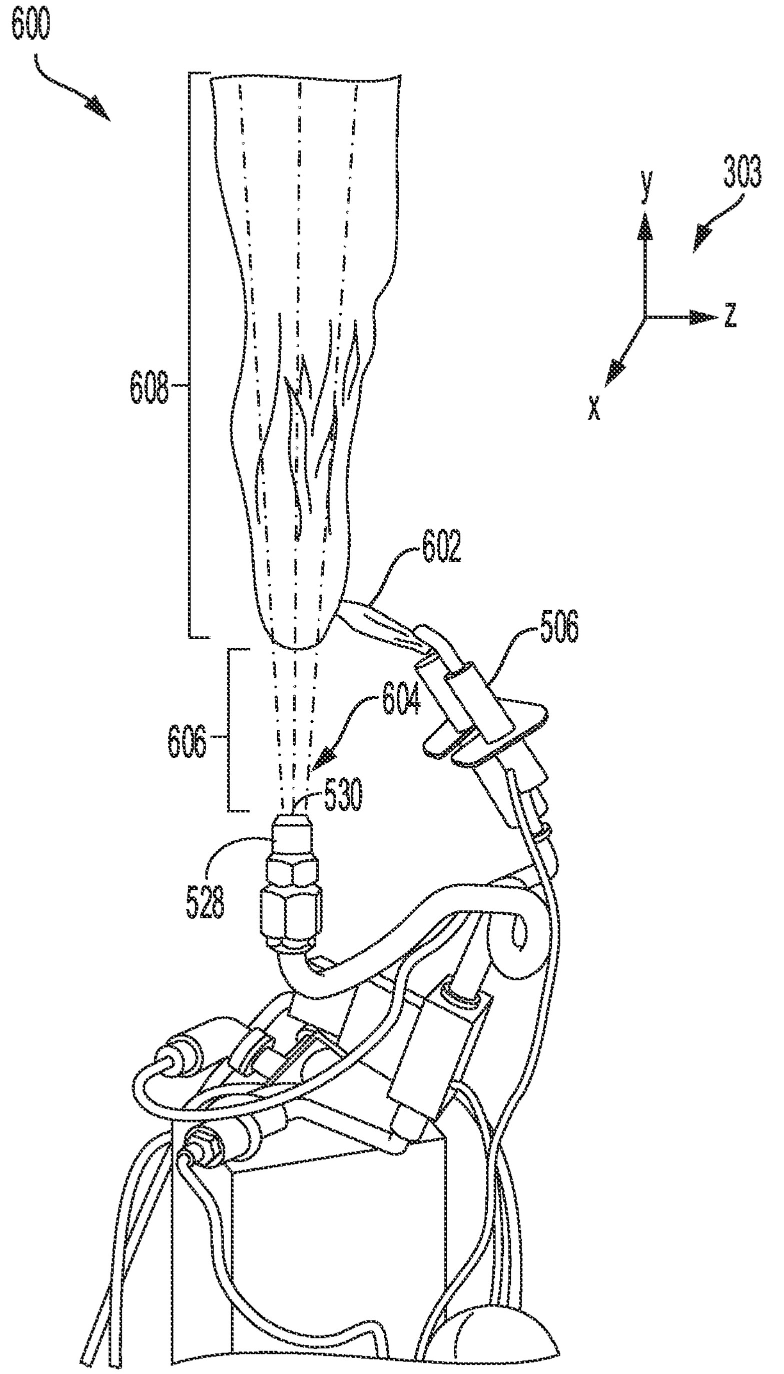
FIG. 6 is a view of the ignition configuration for the torch without a housing, according to one or more examples of the present disclosure.
Figure 7:
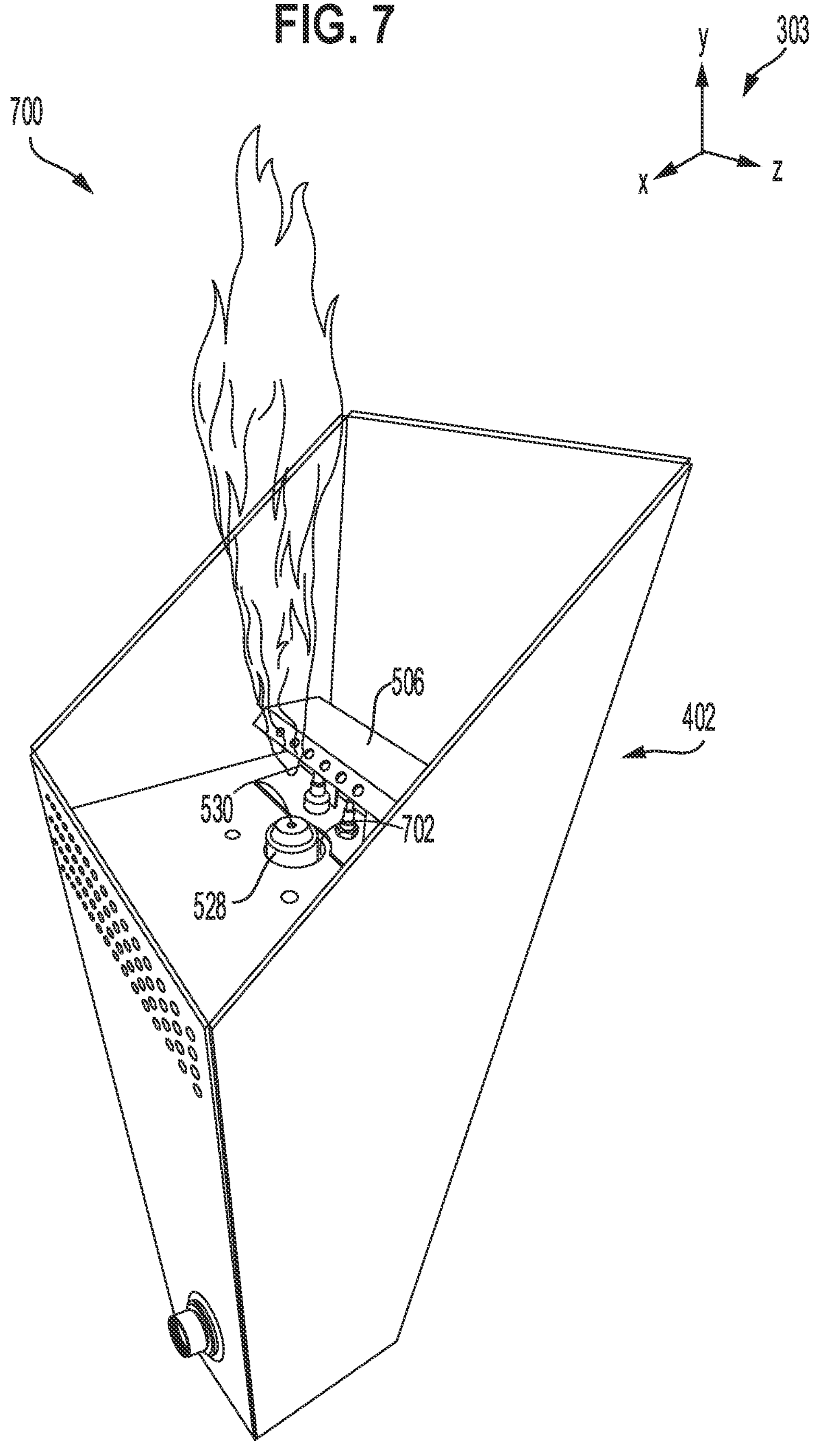
FIG. 7 is a view of an ignition configuration for an assembled torch in operation, according to one or more examples of the present disclosure.
Figure 10:
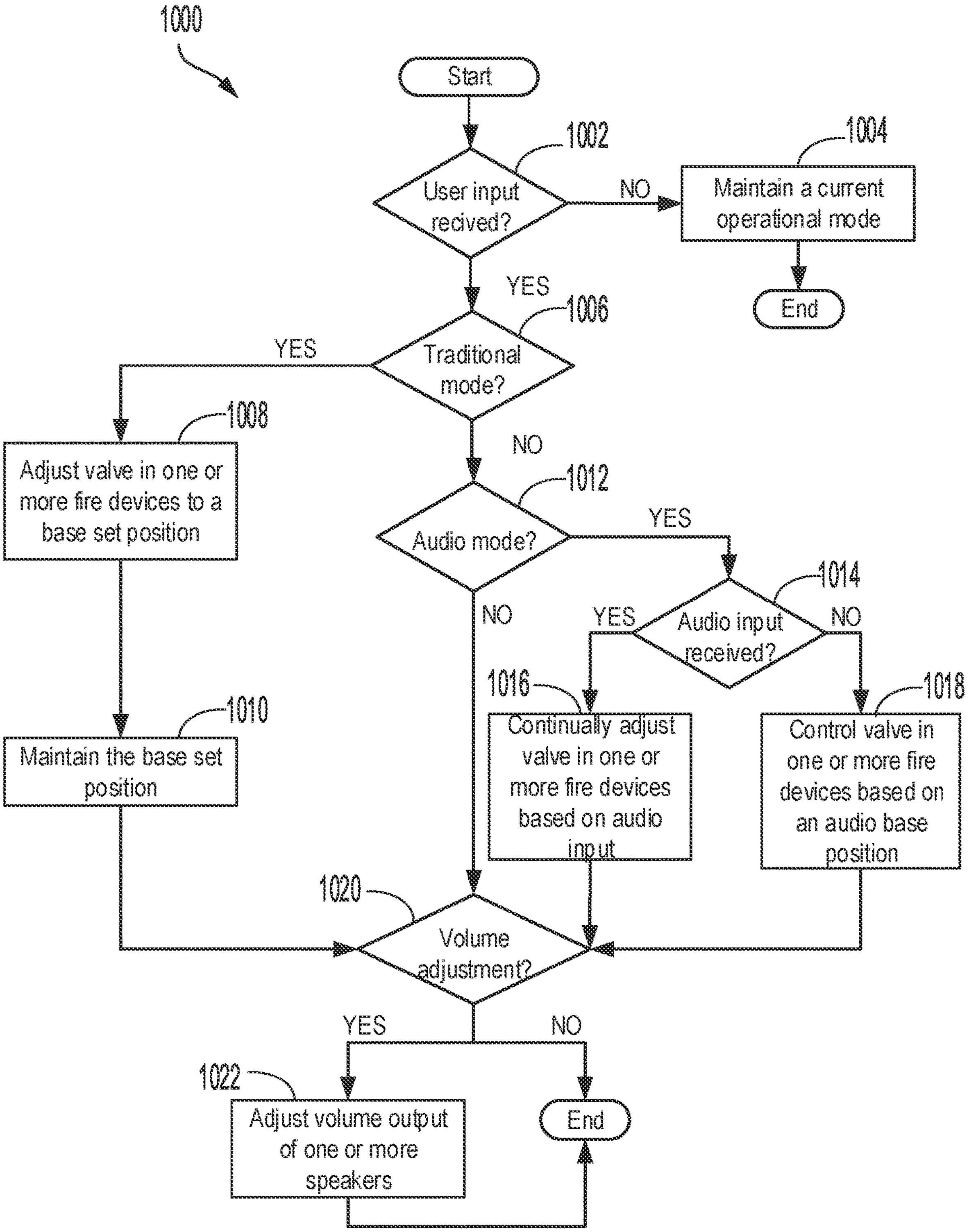
FIG. 10 is a flow chart of a method for operating the torch system, according to one or more examples of the present disclosure.

The hub may be used to control the fire devices in a traditional mode or an audio mode, as discussed at FIG. 10. In the traditional mode, a consistent flame height and size may be maintained for the fire devices. In contrast to the traditional mode, the flame height and size is varied in the audio mode to provide flame bursts in coordination to an audio input such as music. As part of providing the fire display, one or more of the fire devices may comprise an ignition configuration such as shown at FIGS. 5-7 to provide a ghost flame effect, in which the flames of the fire devices appear to float above their respective gaseous fuel injectors. The ghost flame effect improves a visibility of the flames provided in the fire display and provides a more pronounced effect during operations, such as when coordinating flame bursts with an audio input.

For purposes of discussion, the below figures are described collectively. Thus, similar elements may be labeled similarly and may not be re-introduced. FIGS. 3A-8B are shown approximately to scale.

Turning first to FIG. 1, FIG. 1 shows a system environment 100, according to one or more examples of the present disclosure. The system environment 100 is shown in a large warehouse space in the present disclosure. In other examples, however, the system environment 100 may instead be an outdoor environment, such as a backyard. The system environment 100 comprises fire devices including a plurality of torches 102*a*, 102*b*, 102*c*, 102*d* (also referred to as torches 102). Though there are four torches shown in the example at FIG. 1, it is noted that additional torches or fewer torches may be included in the system without departing from the scope of the disclosure. The torches 102 shown in FIG. 1 may correspond to one or more of the example configurations described herein at FIGS. 3A-7.

In addition to the torches 102, the system environment 100 comprises additional fire devices including a first fire pit 104*a*, a second fire pit 104*b*, and a third fire pit 104*c* (also referred to as fire pits 104). As with the torches 102, there may be additional fire pits or fewer fire pits included in the system, in at least one example. The torches 102 and the fire pits 104 together may form a fire display 101 controlled by a hub 110.

The hub 110 is a controller that comprises a processor with instructions stored in non-transitory memory that, when executed, sends control signals to control one or more of the torches 102 and the fire pits 104. For example, the control signals sent from the hub 110 may be received at controllers of the respective torches 102 and fire pits 104. The controllers of the respective torches 102 and fire pits 104 may also be referred to as fire device controllers herein. Each of the torches 102 and fire pits 104 additionally comprises an ignitor and at least one electric valve positioned therein that is configured to adjust an amount of fuel provided for ignition of the respective torch or fire pit.

Responsive receiving the control signals from the hub 110, the controllers of the torches 102 and fire pits 104 may then actuate at least one of the electric valve and the ignitor of the respective torch and fire pit 104. Via such actuation, a flame size and height may be controlled for the torches 102 and fire pits 104.

The control signals are sent from the hub 110 to one or more of the torches 102 in response to the processor of the hub 110 receiving input signals. The control signals may further be sent from the hub 110 to one or more of the fire pits 104 responsive to such input signals. In at least one example, the processor of the hub 110 receives input signals via one or more of a wireless receiver of the hub 110, a hardwired connection of the hub 110, and a user interface integrated into the hub 110 itself, where the user interface comprises one or more user input devices (e.g., buttons, dials, a touch screen) to receive the input signal. In examples where the hub 110 receives input signals via a wireless receiver, it is noted that the input signals may be received from a mobile device or personal computing device communicatively coupled to the hub 110 via the wireless receiver.

The input signals received at the hub 110 may include a mode selection received at the hub 110. For example, the mode selection may include selection of a traditional mode or an audio mode. In the traditional mode, the torches 102 and fire pits 104 are operated with their respective electric valves maintained at a predetermined base position. At the predetermined base position, the electric valves of the torches 102 and the fire pits 104 are at least partially open and allow fuel to flow to their respective burners. If the electric valve of any of the torches 102 and fire pits 104 being controlled in the traditional mode is not at the base position when the traditional mode is selected, then the electric valve is first adjusted to the predetermined base position and maintained in the base position for a duration of the traditional mode. Due to the maintained position of the electric valve, a steady flame size and height is maintained in the traditional mode.

In the audio mode, the torches 102 and fire pits 104 are operated with their respective electric valves being varied in coordination to an audio input, such as music. Thus, responsive to receiving a user input selecting the audio torch mode and further receiving the audio input, the hub 110 may send control signals to the torches 102 and fire pits 104 based on the audio input.

In particular, the hub 110 may send control signals to adjust respective electric valves of the torches 102 and the fire pits 104 in coordination with the audio input. It is noted that the audio input may be received at the hub 110 via a wireless or a wired connection. For example, the audio input may be received at the hub 110 via wirelessly streaming the audio input to the hub 110 via a mobile device or other personal computing device. In such examples, a wireless receiver of the hub 110 may receive the audio input. As another example, the audio input may be received at the hub 110 via an aux input or other wired audio input. In such examples, a mobile device or other personal computing device may provide the audio input to the hub 110 via such an aux input or other wired audio input.

The electric valve may be adjusted to positions more open than the base position of the traditional mode while in the audio mode, based on the audio input. Additionally, the electric valve may be adjusted to positions that are less open than the base position of the traditional mode while in the audio mode, based on the audio input. In this way, flame bursts and decreases in flame size may be created for the fire display. Thus, in contrast to the traditional mode, the torches 102 and fire pits 104 produce flame sizes and heights that are varied throughout the audio mode in coordination with the audio input.

In at least one example, a flame boost mode may further be available, in which a maximum fuel flow is provided to a burner. In some examples, the flame boost mode may be used for purposes of heating an accessory, such as a griddle or grill attachment. The flame boost mode may also be used for purposes of producing a maximum flame height and size, which may be of interest for lighting or theatrical effect, for example. In the flame boost mode, the respective electric valve of the torches 102 or fire pits 104 is actuated to a wide open position. In at least one example, the flame boost mode may further require a mechanical valve providing fuel to the burner to be manually adjusted to a wide open position, in addition to the electric valve being adjusted to the wide open position.

In examples where the flame boost mode is available, it is noted that the wide open position of the electric valve is more open than the base position for the traditional mode. That is, in examples where the fire devices include the flame boost mode, the flame boost mode creates a maximum flame height and size, which is larger than the flame height and size when operating in the traditional mode.

In at least one example, hub 110 allows for there to be separate control of the torches 102 and the fire pits 104. In separate control examples, it is noted that the mode selections for each of the fire pits 104 and the torches 102 may be made individually set. Thus, each of the torches 102 and each of the fire pits 104 is able to have its own mode selected and individually controlled via the hub 110.

Additionally, or alternatively, the hub 110 may control the torches 102 and the fire pits 104 collectively. In collective control examples, the hub 110 may control the torches 102 and the fire pits 104 all together to be in the same mode. For example, in collective control examples, selection of the traditional mode may result in all of the torches 102 and the fire pits 104 being set to the traditional mode. Further, in the collective control examples, selection of the audio mode may result in all of the torches 102 and the fire pits 104 being set to the audio mode. As to selection of the flame boost mode, in the collective control examples, selection of the flame boost mode may result in all of the torches 102 and the fire pits 104 being controlled to have their respective electric valves in a wide open position.

Further, the hub 110 may additionally or alternatively control the torches 102 and fire pits 104 in sub-groups. In such sub-group control, sub-groups of the torches 102 and/or the fire pits 104 may be formed for control of the sub-group to be the same. For example, in sub-group control, the hub 110 may control the torches 102 together as an all torches sub-group and may control the fire pits 104 together as an all fire pits sub-group. Thus, in this example, the mode for the all torches sub-group being selected as the traditional mode would result in the torches 102 all being set to the traditional mode. Alternatively, the mode for the all torches sub-group being selected as the audio mode would result in the torches 102 all being set to the audio mode. Similarly, in this example, the mode for the all fire pits sub-group being selected as the traditional mode would result in the fire pits 104 all being set to the traditional mode. Or, alternatively, the mode for the all fire pits sub-group being selected as the audio mode would result in the fire pits 104 all being set to the audio mode.

In another sub-group control example, the hub 110 may control a portion of the torches 102 as a first torch sub-group, another portion of the torches 102 as second torch sub-group, a portion of the fire pits 104 as a first fire pit sub-group, and another portion of the fire pits 104 as a second fire pit sub-group. Moreover, a sub-group may contain both torches 102 and fire pits 104, in at least one example.

It is noted that if selection of any of the traditional mode, audio mode, and flame boost mode is also determined to initiate ignition at one or more of the torches 102 and fire pits 104, then the hub 110 may further send a control signal to activate respective ignitors of such torches and fire pits.

Turning now to FIG. 2A, FIG. 2A shows a schematic system connectivity map 200, according to one or more examples of the present disclosure. In at least one example, each of the torches 102 may comprise a respective wire connection clamp 204*a*, 204*b*, 204*c*, 204*d* (also referred to as wire connection clamps 204) that electrically and physically couples the torches 102 to a common line 202. The common line 202 is an electrical wire. In at least one example, the common line 202 may be a low voltage wire, such as a landscape wire. In at least one example, the common line 202 may comprise 12/2 landscape wire.

View 206 shows a detailed view of wire connection clamp 204*a* and common line 202 in a coupled configuration. Wire connection clamps 204*b*, 204*c*, 204*d* are configured similarly to wire connection clamp 204*a*. Thus, wire connection clamps 204*b*, 204*c*, and 204*d* include similar features as described in connection to wire connection clamp 204*a* and these features are not reintroduced. As seen in view 206, wire connection clamp 204*a* includes electrical connection lines 208*a*, 208*b* (also referred to herein as input lines) which connect to a controller of respective torch 102*a*. The wire connection clamp 204*a* is able to be opened and closed through pivoting, as illustrated via arrow 212. That is, the wire connection clamp 204*a* is able to be opened by pivoting the ends of the wire connection clamp 204*a* such that external bottom surfaces are pivoted towards each other. The wire connection clamp 204*a* is closed by pivoting the ends of the wire connection clamp 204*a* such that one or more metal teeth 214 are moved towards the common line 202. In a closed and coupled position, the one or more metal teeth 214 penetrate the common line 202 to form an electrical connection between the common line 202 and the electrical connection lines 208*a*, 208*b*. The electrical connection lines 208*a*, 208*b* may also be referred to herein as input lines. In one or more examples, the wire connection clamp 204*a* may be biased towards a closed position, helping to maintain contact with the common line 202. The use of wire connection clamps 204 to couple the torches 102 to common line 202 enables flexible placement of the torches 102 along the common line 202 in a daisy-chain manner. That is, the torches 102 are able be positioned anywhere along the common line 202, as opposed to needing to be placed at predetermined positions. The daisy-chain coupling of the torches 102 along the common line 202 may enable one or more of analog and digital signaling to be provided to the torches 102 via the common line 202.

As further seen in FIG. 2A, the hub 110 is also coupled to the common line 202. In at least one example, the hub 110 is coupled to the common line 202 via a port configuration. For example, the hub 110 may be coupled to the common line via the port configuration as shown a FIG. 8B. Thus, the hub 110 is able to send control signals to torches 102 via the common line 202 to control the respective electric valves and ignitors of the torches 102. Due to the connection of the torches 102 and the hub 110 to the common line 202 for such actuation of such respective electric valves and ignitors, the hub 110 is able to control the flame bursts of the torches 102 in coordination with an audio input in a simple and synchronized manner.

In addition to the torches 102, the hub 110 may further be communicatively coupled to one or more of the additional fire devices. Though only the first fire pit 104*a* is shown coupled to the common line 202 in FIG. 2, the second fire pit 104*b* the third fire pit 104*c* may additionally or alternatively be coupled to the common line 202, in at least one example. Further, the connection between the hub 110 and the additional fire devices may additionally or alternatively be a wireless connection.

In at least one embodiment, the hub 110 may be integrated into an additional fire device itself, as shown in FIGS. 2B-2C. It is noted that FIGS. 2B-2C show a second schematic system connectivity map 201 and a third schematic connectivity map 203, respectively. For example, the hub 110 may be integrated into a fire pit in FIGS. 2B-2C. For example, the hub 110 may be integrated into a fire pit with a first shape at FIG. 2B and the hub 110 may be integrated into a fire pit with a second shape at FIG. 2C. It is noted that the fire pit into which the hub 110 may be integrated into at FIGS. 2B-2C may be similar to one of the first fire pit 104*a*, the second fire pit 104*b*, or the third fire pit 104*c* described herein. In such examples where the hub 110 is integrated into an additional fire device (e.g., a fire pit), the hub 110 and the common line 202 may be coupled via a port configuration formed into the additional fire device, where the port configuration may be similar or the same as that described at FIG. 8B.

Figure 3A:
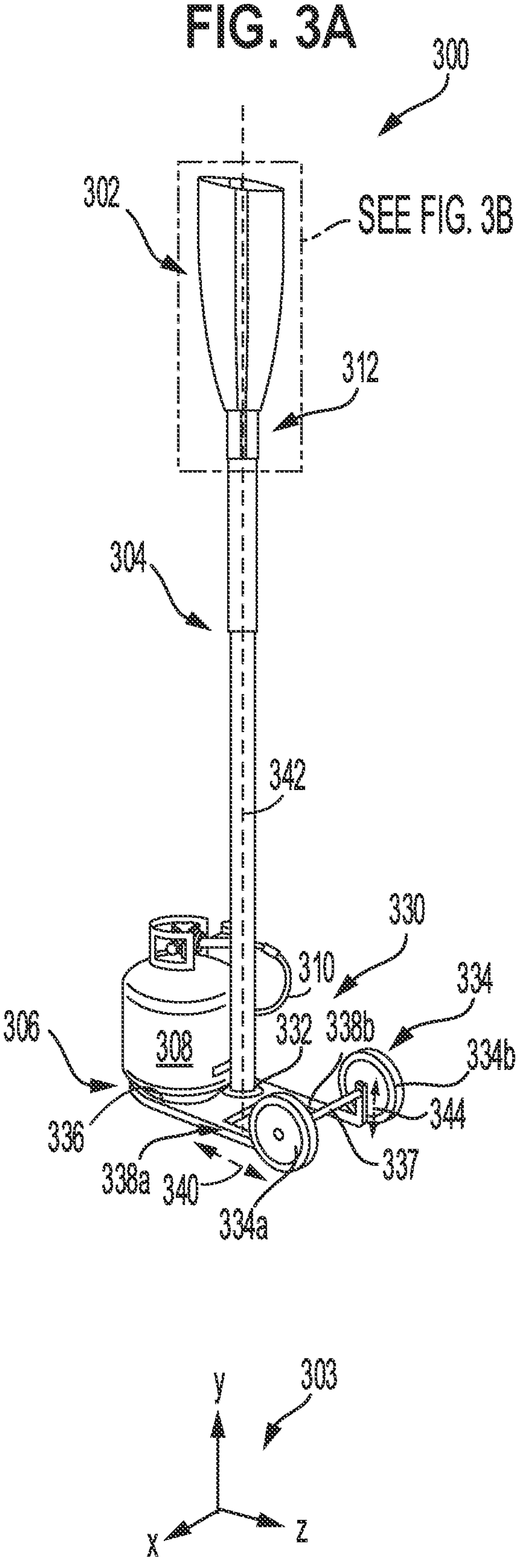
FIG. 3A shows a torch with a first example housing, according to one or more examples of the present disclosure.
Figure 3B:
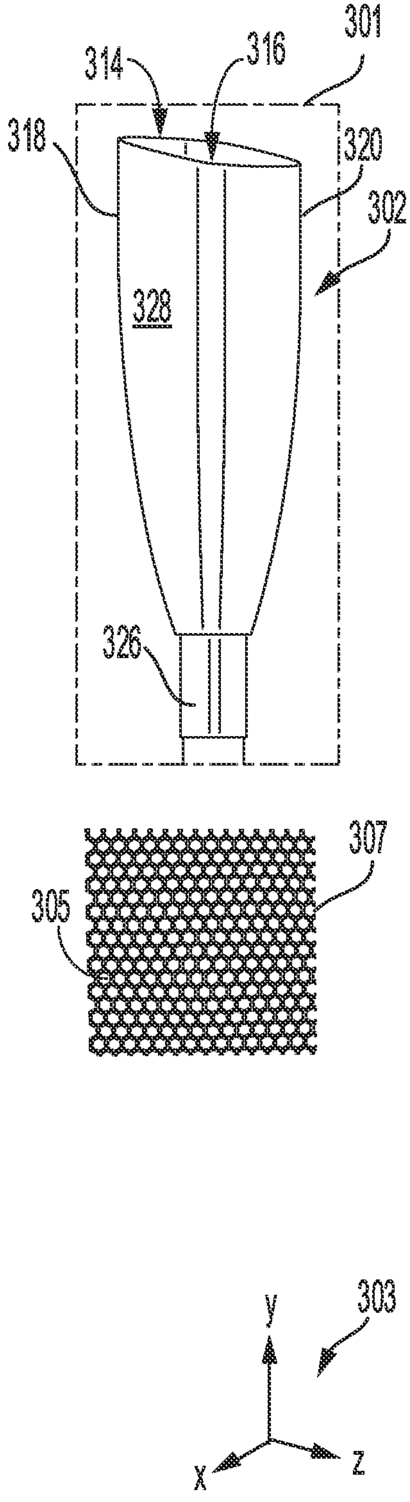
FIG. 3B shows an exploded view of the first example housing, according to one or more examples of the present disclosure.

Looking now to FIG. 3A and FIG. 3B, FIG. 3A shows a torch 300 with a first example housing, according to one or more examples of the present disclosure. FIG. 3B shows an exploded view of the first example housing 301, according to one or more examples of the present disclosure. FIGS. 3A and 3B are described together.

A set of reference axes 303 are provided for comparison between views shown, indicating a y-axis, an x-axis, and a z-axis. In one example, the y-axis may be parallel with a direction of gravity and the x-z plane may be parallel with a horizontal plane. It is noted that the y-axis is pointing an opposite direction as the direction of gravity. The reference axes 303 are included throughout the figures herein to assist in understanding an orientation of components and features relative to one another, in one or more examples. Thus, it is noted that the reference axes 303 may be used to help describe the orientation of components relative to one another and to describe their features.

As seen in FIG. 3A, torch 300 includes a housing 302, a pole extension 304, and a base 306. It is noted that a fuel source 308 is shown coupled to the torch 300 via a fuel line 310. In one or more examples, the pole extension 304 may be hollow, and the fuel line 310 may extend into the inside of the pole extension 304 and run along the inside of pole extension 304 into the housing 302. In at least one example, the fuel source 308 may comprise liquefied petroleum gas (LPG), also referred to as propane. In other examples, however, natural gas may instead be used as the fuel source. Though fuel source 308 is shown external to the housing 302, it is noted that in one or more examples the fuel source 308 may instead be positioned within the housing 302 or any other housing disclosed herein. It is noted that a length of the pole extension 304 may be varied without departing from the scope of this disclosure.

The housing 302 of torch 300 is rounded in shape. A material of the housing 302 may be metal, in at least one example. However, the housing 302 may additionally or alternatively comprise other flame and heat resistant materials. For example, glass, stone, or silica-infused materials that are sufficiently flame and heat resistant to withstand sustained exposure to an open flame may be used.

In one or more examples, at least a portion of housing 302 may have a windscreen 307 formed therein, where the windscreen 307 may include a series of openings 305 in the housing 302 that allow air to pass through. By having at least a portion of the housing 302 formed with a windscreen 307, advantages as to improved access to oxygen for the combustion of the gaseous fuel and visibility of the flame may be achieved while breaking up wind gusts that could degrade a flame quality.

In at least one example, a top edge 314 of the housing 302 that defines an opening 316 of the housing 302 may be sloped. In particular, the opening 316 may be rounded in shape, and a rear portion 318 of the housing 302 may extend higher than a front portion 320 of the opening. It is noted that a size of the opening 316 may vary. That is, the front portion 320 of the housing 302 may be lower than the rear portion 318 of the housing. In such examples, a first distance from the top edge 314 at the rear portion 318 to a collar 326 of the attachment end 312 is greater than a second distance from the top edge 314 at the front portion 320 to the collar 326. By having the top edge 314 of the housing 302 lower at the front portion 320 than at the rear portion 318, a flame of the torch is more visible compared to a housing where a top edge is at a same height all the way around an opening. Moreover, due to the sloping of the top edge 314, protection is provided against wind.

The housing 302 may contain an ignition configuration therein. For example, the ignition configuration positioned within the housing 302 may be similar or the same ignition configuration as shown at FIG. 5. It is noted that the torch 300 at FIGS. 3A and 3B is shown when the torch is not in operation. Thus, no flame extends above the housing in FIGS. 3A and 3B. When the torch is in operation, such as in the traditional mode or the audio mode, a flame is visible above at least the front portion 320 of the housing 302.

The attachment end 312 of the housing 302 is coupled to the pole extension 304 of torch 300. The attachment end 312 of the housing is joined to the pole extension 304 via an attachment means. For example, one or more of threading, screws, pins, and welding attachment means may couple the housing 302 to the pole extension 304. In at least one example, the collar 326 at the attachment end 312 of the housing may comprise threads therein that engage with body 328 of the housing 302. It is noted that the collar 326 is rounded in shape. Thus, in such examples, the body 328 of the housing 302 may be screwed on an off of the pole extension 304. Alternatively, the body 328 of the housing 302 may be fixedly coupled to the collar 326 and pole extension 304 of the torch 300.

A base end 330 of the pole extension 304 is coupled to the base 306 of the torch 300. The base end 330 of the pole extension 304 may be coupled to a base opening 332 formed into the base 306 via one or more of threading, screws, pins, and welding attachment means. The base end 330 of the pole extension 304 may be releasably coupled to the base 306 (e.g., via one or more of threads, screws, etc.) or fixedly coupled to the base 306 (e.g., via welding). The base 306 to which the pole extension 304 is attached may be weighted and sized to allow the torch 300 to freely stand.

In one or more examples, the base 306 may comprise one or more wheels 334 for transportation purposes. The base 306 comprises two wheels 334*a*, 334*b* connected by an axle 337. The axle 337 extends through arms 338*a*, 338*b* of the base 306, where the arms 338*a*, 338*b* are L-shaped. A length 340 of the arms 338*a*, 338*b* extends perpendicular to a longitudinal axis 342 of the pole extension 304, and a height 344 of the arms 338*a*, 338*b* extends substantially parallel to the longitudinal axis 342 of the pole extension 304.

The axle 337 extends through the height 344 portion of the arms 338*a*, 338*b* to the wheels 334*a*, 334*b*, and the wheels 334*a*, 334*b* are positioned outside of the arms 338*a*,

338*b*. Thus, the both the axle 337 and the arms 338*a*, 338*b* are positioned between the wheels 334*a*, 334*b*. The arms 338*a*, 338*b* are further separated from each other via a U-shaped opening formed therebetween. The axle 337 extends above the U-shaped opening. Further, the wheels 334 and axle 337 configuration is positioned at an opposite end to the platform 336 of the base 306, where the pole extension 304 is positioned between the wheels 334 and axle 337 configuration and the platform 336. As shown, the fuel source 308 may be positioned on top of the platform 336, in one or more examples. The platform 336 may be substantially planar, in at least one example. Alternatively, the platform 336 may comprise receiving grooves for positioning the fuel source 308 therein.

In the example shown at FIG. 3A, the torch 300 is shown in a resting position, where a platform 336 of the base 306 is in contact with the ground. In the resting position, the torch 300 is not able to be wheeled via the wheels 334 and is in a free standing position. Via the configuration of the torch 300, a user may transition the torch 300 from the resting position to a wheeling position by pushing down on the axle 337 with their foot to pivot the torch 300 onto the wheels 334. In the wheeling position, the platform 336 is raised off of the ground and able to be easily transported to various locations. The pole extension 304 may further be held onto to assist in transporting the torch 300.

Though the base 306 is shown in FIG. 3A, it is noted that the torch 300 may additionally or alternatively include a mounting clamp on the pole extension 304 to mount the torch to another component such as a railing, for example. Torch 400, discussed at FIG. 4A, may also additionally or alternatively include a mounting clamp to mount the torch to a component such as a railing.

Figure 4A:
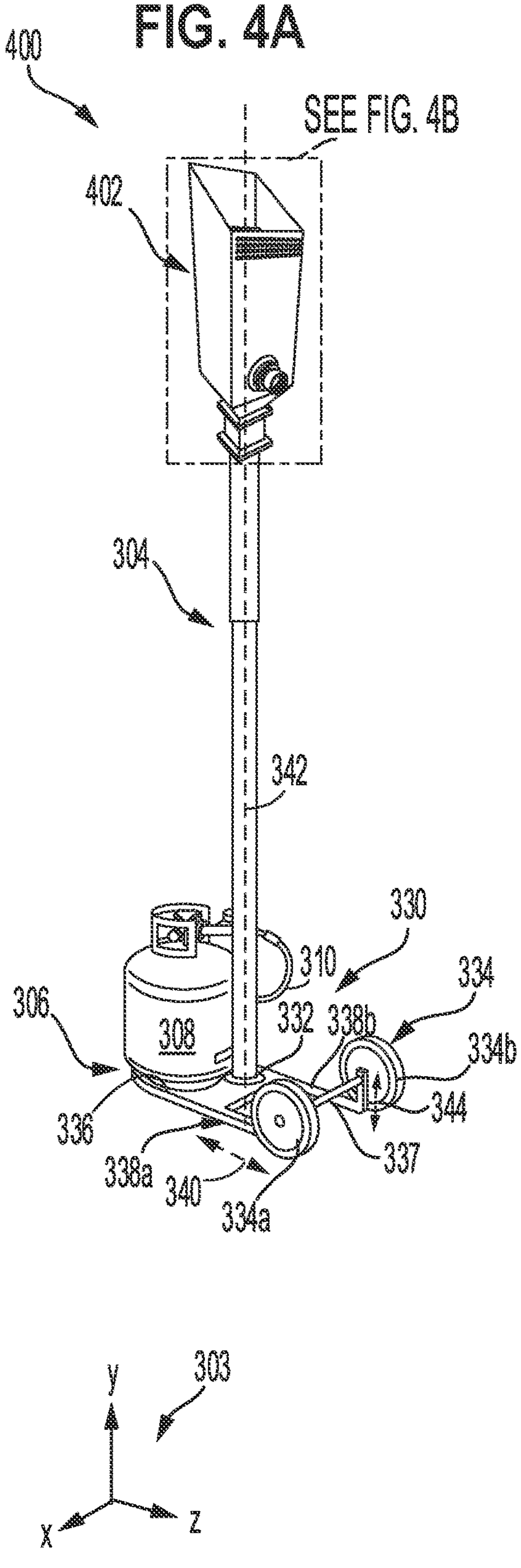
FIG. 4A shows a torch with a second example housing, according to one or more examples of the present disclosure.
Figure 4B:
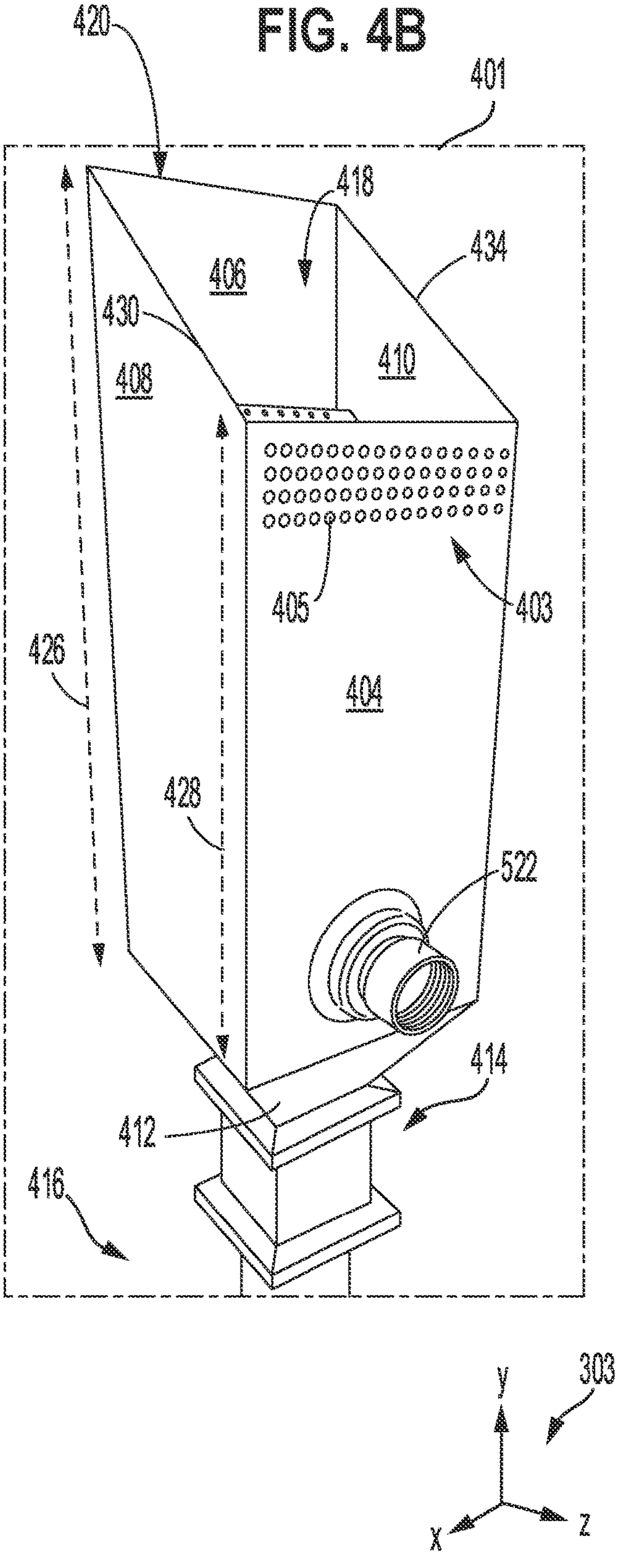
FIG. 4B shows an exploded view of the second example housing, according to one or more examples of the present disclosure.

Turning now to FIG. 4A and FIG. 4B, FIG. 4A shows a torch 400 with a second example housing, according to one or more examples of the present disclosure. FIG. 4B shows an exploded view 401 of the second example housing, according to one or more examples of the present disclosure.

It is noted that many of the components between FIGS. 3A-3B are similar to those shown in FIGS. 4A-4B. Thus, such components have been labeled similarly and may not be re-introduced. Attention in FIG. 4A and FIG. 4B is focused on housing 402.

Housing 402 comprises multiple quadrilateral panels, including a front panel 404, rear panel 406, a first side panel 408, and a second side panel 410. The housing 402 further includes bottom panels 412 and a collar 414, where the collar 414 is at an attachment end 416 of the housing 402 where the housing 402 is coupled to the pole extension 304. A material of the housing 402 may be metal, in at least one example. In such examples, the panels of the housing 402 may be joined via welded joints. However, the housing 402 may additionally or alternatively comprise other flame and heat resistant materials. For example, glass, stone, or silica-infused materials that are sufficiently flame and heat resistant to withstand sustained exposure to an open flame may be used. Depending on the material used, different shaping and joining approaches may be used to form the housing, such as molding.

The front panel 404, rear panel 406, first side panel 408, and second side panel 410 define a perimeter of an opening 418 of the housing 402. The opening 418 may be rectangular in shape. In at least one example, the opening 418 may be substantially square in shape. It is noted that FIG. 4A and FIG. 4B show the torch 400 when the torch 400 is not in operation, thus no flame is shown. During operation of the torch 400, a flame extends out of the opening 418, with the front panel 404, rear panel 406, a first side panel 408, and a second side panel 410 surrounding the flame.

In at least one example, the front panel 404 is vertically lower than the rear panel 406. That is, a top edge 420 of the housing 402 is lower at the front panel 404 than at the rear panel 406. In this way, a first distance from the top edge 420 to the collar 414 at the rear panel 406 is greater than a second distance from the top edge 420 to the collar 414 at the front panel 404.

The top edge 420 of the housing 402 further slopes downward towards the attachment end 416 from the rear panel 406 to the front panel 404 at the first side panel 408 and the second side panel 410. In particular, a rear side length 426 of the first side panel 408 is longer than a front side length 428 of the first side panel 408, resulting in a top edge of the first side panel 430 that slopes downward towards the attachment end 416. Further, a rear side length of the second side panel 410 is also longer than a front side length of the second side panel 410, resulting in a top edge of the second side panel 434 sloping downwards towards the attachment end 416. In at least one example, the first side panel 408 and the second side panel 410 may be substantially identical in shape and size.

By having the top edge 420 lower at a front portion than at a rear portion of the housing 402, a flame of the torch is more visible compared to a housing where a top edge is at a same height all the way around an opening. Moreover, protection is provided against wind via such a configuration.

In addition to the above, the front panel 404 of the housing 402 may further have a windscreen 403 formed therein, where the windscreen 403 includes a series of openings 405 in the housing 402 that allow air to pass through. That is, the openings 405 of the windscreen 403 allow air to flow from outside of the housing 402 to inside the housing, surrounded by the front panel 404, rear panel 406, and side panels 408, 410. By having at least a portion of the housing 402 formed with a windscreen 403, advantages as to improved access to oxygen for the flame and visibility of the flame may be achieved while breaking up wind gusts that could degrade a flame quality.

The housing 402 may further contain an ignition configuration therein. For example, the ignition configuration positioned within the housing 402 may be similar or the same ignition configuration as shown at FIG. 5. A fan lighter 506 of the ignition configuration is visible at FIG. 4A and FIG. 4B, which is discussed in greater detail at FIG. 5. Furthermore, a user input device 522 of the ignition configuration is integrated into the housing 402, where the user input device 522 is in the form of a dial. It is noted that the user input device 522 is also discussed in further detail at FIG. 5.

Continuing with FIG. 4A and FIG. 4B, the attachment end 416 of the housing 402 is coupled to the pole extension 304 of torch 400. The attachment end 416 of the housing is joined to the pole extension 304 via an attachment means. For example, one or more of threading, screws, pins, and welding attachment means may couple the housing 402 to the pole extension 304. In at least one example, a collar 414 at the attachment end 416 of the housing may comprise threads therein that engage with a body of the housing 402. It is noted that the collar 414 comprises a substantially square cross-sectional shape. Thus, in such examples, the body of the housing 402 may be screwed on an off of the pole extension 304. Alternatively, the body of the housing 402 may be fixedly coupled to the collar 414 and pole extension 304 of the torch 400. Moreover, though pole extension 304 is represented with a rounded cross-sectional shape, in one or more examples it is noted that the pole extension 304 may instead have a substantially square cross-sectional shape. This may be of interest for simplified attachment of the collar 414 and the pole extension 304 of torch 400.

Turning now to FIG. 5, FIG. 5 shows a schematic diagram of an ignition configuration 500, according to one or more examples of the present disclosure. The ignition configuration 500 may be included in a fire device, including any of the example fire devices described herein, such as the torches 102, the fire pits 104, torch 300, and torch 400.

The ignition configuration 500 is shown within an exemplary housing 502 of a fire device, where the housing 502 includes a windscreen 504. While exemplary housing 502 is shown in FIG. 5, it is noted that another housing such as housing 302 or 402 may instead be used. The ignition configuration 500 is shown in a non-operational state.

The ignition configuration includes a fan lighter 506. The fan lighter 506 may be a T-shaped burner, in at least one example. The fan lighter 506 may comprise an air mix valve 507, in at least one example. In such T-shaped burner examples, a fan base section 508 that extends parallel to a longitudinal axis 510 of the fire device may be narrower than a fan flame section 512 that extends perpendicular to the longitudinal axis 510. Alternatively, the fan lighter 506 may not be a T-shaped burner in one or more examples. In such non T-shaped examples, fan base section 508 may be a same width or wider than the fan flame section 512. In one or more examples, it is noted that one or more air flow openings may be formed into the fan base section. In this way, air flow for producing flames via the ignition configuration is improved.

A plurality of openings 514 for fuel flow are formed into the fan flame section 512. The plurality of openings 514 are arranged in a row that extends in a direction substantially perpendicular to the longitudinal axis 510 of the fire device, and, during operation, gaseous fuel is flowed out of the plurality of openings 514. While the openings 514 are shown in a single row configuration at FIG. 5, it is noted that multiple rows of openings 514 may be possible in one or more examples.

The plurality of openings 514 are adjacent to a pilot light ignitor 516 and in fluid communication with pilot light gas tube 518, where gaseous fuel is received at the pilot light gas tube 518 via a gas connection 520. Though not shown in FIG. 5, it is noted that the gas connection 520 is coupled to a fuel source, such as fuel source 308. It is noted that the gas connection 520 may be a quick gas connection in one more examples. The fuel source may be LPG or a natural gas fuel source, in one or more examples.

The ignition configuration 500 may further include a flame detection sensor 515 such as, for example, a thermocouple. Thus, the flame detection sensor 515 is also referred to as a thermocouple herein. The fire device controller 538 may shut off a first valve 524 when no flame is detected by the thermocouple 515.

A user input device 522 may be provided to receive user inputs for adjusting operation of the ignition configuration 500. For example, the user input device 522 may be a dial, button, touch screen, or other user input device 522. In at least one example, the user input device 522 may be mechanically coupled to a first valve 524 to adjust a position of the first valve 524.

The user input device 522 may be adjustable to different positions for commanding various modes of the fire device. For example, one or more of the traditional mode, the audio mode, the flame boost mode, an off mode, an ignition mode, and a base flame level may be adjusted by way of the user input device. A separate ignitor button 523 is further shown in FIG. 5, which may cause an ignitor 516 to spark responsive to receiving a user input. For example, the ignitor button 523 may be a push button that causes an ignitor 516 of the ignition configuration 500 to spark responsive to a manual user input. In one or more examples, however, it is noted that the user input device 522 may also be configured to cause ignitor 516 to spark when in the ignition mode. Thus, in some examples, there may not be a separate ignitor button 523 and control of the ignitor 516 may instead be integrated into the user input device 522.

Responsive to receiving a user input at user input device 522 for the ignition mode and/or receiving a user input at the ignitor button 523, the ignitor 516 is actuated to spark. Additionally, a first valve 524 is actuated and gaseous fuel is flowed through the pilot light gas tube 518 as well as through a gaseous fuel injector 528. For example, via first valve 524, gaseous fuel may be flowed to the pilot light gas tube 518 via line 532 and may further provide gaseous fuel to the gaseous fuel injector 528 via line 534. The gaseous fuel flowed through the pilot light gas tube 518 is directed through the openings 514 of the fan lighter 506, to produce flames that extend in a plane from the fan lighter 506. In one or more examples, the fan lighter 506 may be specifically configured to provide blue flames that are difficult to see. Such blue flames may assist in creating a fire display where the flame is more clearly defined. The blue flames may be formed by the fan lighter 506 by providing additional oxygen via air mix valve 507. Though a gaseous fuel injector 528 is shown, in at least one example it is noted that an alternative gas burner is also possible.

In addition to the gaseous fuel injector 528 receiving gaseous fuel via the first valve 524, the gaseous fuel injector 528 may further receive gaseous fuel via a second valve 536. In at least one example, the first valve 524 may be a mechanical valve (e.g., controlled via mechanical connection to user input device 522), whereas the second valve 536 may be an electric valve. Alternatively, both the first valve 524 and the second valve 536 may be electric valves. It is noted that the first valve 524 and the second valve 536 are both considered to be positioned upstream of the gaseous fuel injector 528, where upstream and downstream is defined based on a direction of gaseous fuel flow from the fuel source to being ignited at either the fan lighter 506 or as part of the ignition portion of the gaseous fuel stream.

Furthermore, in at least one example, the fire device may only include the second valve 536. In such examples, adjustment of the user input device 522 may adjust the second valve 536 and the second valve 536 is further electrically adjustable via the fire device controller 538 and electric actuator 537.

The second valve 536 may be actuated via fire device controller 538. In at least one example, the second valve 536 may be a solenoid valve that is actuated via an electric actuator 537. In such examples, the fire device controller 538 may adjust a position of the second valve 536 by outputting signals to the electric actuator 537 for adjusting the position of the second valve 536. The fire device controller 538 may actuate the second valve 536 to adjust a position of the second valve 536 responsive to receiving signals from a hub (e.g., hub 110). The fire device controller 538 may receive control signals from the hub as described herein. For example, the control signals may be received from the hub along a common line, where the fire device is coupled to the common line via a wire connection clamp. As shown in FIG. 5, the ignition configuration 500 may comprise input lines 208*a*, 208*b* that are coupled to the fire device controller 538 at a first end of the input lines 208*a*,

208*b*. It is noted that at a second, opposite end, the input lines 208*a*, 208*b* may be connected to the wire connection clamp (e.g., one of the wire connection clamps 204) as shown in FIGS. 2A-2C. In such examples, the wire connection clamp coupled to the input lines 208*a*, 208*b* at their second, opposite ends is further coupled to the common line (e.g., common line 202). Examples for coupling the ignition configuration 500 to the hub may include at least those discussed at FIGS. 2A-2C, for example. Alternatively, it is possible that the control signals are received from the hub wirelessly at the fire device controller.

Continuing with FIG. 5, as noted above, the first valve 524 may be physically coupled to the user input device 522. Such physical connection may enable manual adjustment of the first valve 524 via the user input device 522. Alternatively, in a case where there is no first valve 524 and there is only the second valve 536, the second valve 536 may be manually adjusted via the user input device 522. For example, the user input device 522 may be a dial, where turning the dial a first direction may adjust the first valve 524 (or alternatively the second valve 536) to a more open position, and turning the dial a second direction may adjust the first valve 524 (or alternatively the second valve 536) to a more closed position. Thus, via the user input device 522, a user is able to set a base amount of fuel allowed to flow for ignition at the fan lighter 506.

In the traditional mode, the second valve 536 may have a base set position that is maintained and a user may provide an input to user input device 522 to set a position of the first valve 524. It is noted that the base set position of the first valve 524 is not a wide open position in the traditional mode. That is, the base set position of the first valve 524 is less open than a wide open position in the traditional mode. In at least one example, the base set position of the first valve 524 may be a closed position for the traditional mode. Therefore, with the first valve 524 in the set base position for the traditional operating mode, a user is able to adjust a flame strength by way of first valve 524 in the standard operating mode. As a result, a consistent flame height and size is provided in the traditional mode.

The audio mode, also referred to herein as the music mode, may be selected via a user input received at the hub (e.g., hub 110). Additionally, the audio mode may also need to be selected via the user input device 522 to enable the audio mode for that particular fire device, in one or more examples.

In the audio mode, the user may manually set a position of the first valve 524 as described above. That is, the user may manually set a position of the first valve 524 to adjust an amount of fuel provided to the gaseous fuel injector 528 for ignition via the fan lighter 506 via the first valve 524. Then, in addition to the position of the first valve 524 set by the user via the user input device 522, the second valve 536 may further be adjusted responsive to an audio input to provide an additional amount of fuel for combustion in accordance to the audio input. That is, in addition to the fuel provided by way of the first valve 524, the second valve 536 positon is further continually adjusted to provide additional fuel to the gaseous fuel injector 528 based on an audio input.

The audio input may be received at the hub, where the hub may include any one or combination of features of the hubs described herein. The hub then in turn sends a control signal based on the audio input to adjust the position of the second valve 536. For example, the hub may send the control signal generated based on the audio input through the common line to which the input lines 208*a*, 208*b* are connected via a wire connection clamp. The fire device controller 538 may then receive the control signal generated based on the audio input via the input lines 208*a*, 208*b* and, responsive to the control signal, actuate the second valve 536 to adjust the position of the second valve 536.

The audio input may be received at the hub from a user device, such as a mobile device or personal computing device, for example. The audio input may be streamed to the hub wirelessly (e.g., short range RF) or via a wired connection (e.g., aux input), as previously discussed. It is additionally noted that any one or combination of features discussed herein with regards to controlling the electric valve via an audio input may be implemented.

The result of the second valve 536 position being continually adjusted is that an amount of additional fuel flowed to the gaseous fuel injector 528 in addition to the base fuel flow from the first valve 524 is adjusted. Thus, the amount of additional fuel flowed to the gaseous fuel injector 528 for ignition via the fan lighter 506 is varied responsive to the audio input. In turn, the flame height and size of the fire display provided via the ignition configuration 500 is coordinated to the audio input.

Put another way, in the audio mode, a base flame strength is provided by the position of the first valve 524 as set by the user via the user input device 522. The second valve 536 is further electrically actuated via control signals received from the hub based on the audio input to provide spikes of additional fuel coordinated to the audio input. Thus, flame bursts are coordinated based on the audio input.

In any of the modes where the ignition configuration 500 is operational, the gaseous fuel is flowed the gaseous fuel injector 528 and injected out of the gaseous fuel injector 528 in a gaseous fuel stream. The gaseous fuel stream is directed vertically upwards towards the plane of flames extending from the fan lighter 506, where the gaseous fuel stream and the plane of flames extending from fan lighter 506 intersect. It is noted that the ignition configuration 500 is not shown in an operational state and thus the plane of flames and the gaseous fuel stream is not shown in FIG. 5. The plane of flames and gaseous fuel stream are shown illustrated in FIGS. 6 and 7.

Thus, looking now to FIG. 6 and FIG. 7, FIG. 6 shows a side view of an ignition configuration 600 with the housing removed, according to one or more examples of the present disclosure. It is noted that the housing is removed in FIG. 6 for viewing purposes. However, any one or combination of housing features disclosed herein may be provided in conjunction with the ignition configuration 600 shown at FIG. 6. In at least one example, the ignition configuration at FIG. 6 may be the ignition configuration 500 with its housing removed and in an operational state. The ignition configuration 600 is shown resting on a stand. This stand does not form part of the ignition configuration. FIG. 7 is a perspective view of an assembled fire device 700 in operation, according to one or more examples of the present disclosure. It is noted that FIG. 7 may also comprise the ignition configuration 500, in at least one example.

As seen in FIG. 6, a plane of flames 602 extending from the fan lighter 506 intersects with a gaseous fuel stream 604 injected via the gaseous fuel injector 528. Thus, the ignition configuration 600 is arranged such that a positioning of the fan lighter 506 relative to the gaseous fuel injector 528 results in the plane of flames 602 intersecting the gaseous fuel stream 604. The gaseous fuel stream 604 is represented via the dash and dot lines extending from the gaseous fuel injector 528.

The plane of flames 602 provided by the fan lighter 506 may intersect with the gaseous fuel stream 604 to provide a ghost flame, where the ghost flame has an unignited portion 606 for at least a threshold distance from the gaseous fuel injector 528 to a start of the ignited portion 608 of the gaseous fuel stream 604. In one or more examples, it is noted that the threshold distance may be a predetermined distance. The predetermined distance from the gaseous fuel injector 528 to the start of the ignited portion 608 of the gaseous fuel stream 604 may be 3 inches, for example. In other examples, the predetermined distance may be greater than 3 inches, such as 6 inches or 8 inches, for example. It is noted that the fan lighter 506 may be positioned at least at the threshold distance above the gaseous fuel injector 528, in one or more examples. If the fan lighter 506 were positioned too close to the gaseous fuel injector 528, it is noted that the floating appearance of the ghost flame would be prevented.

As can be seen in FIGS. 6 and 7, the fan lighter 506 is positioned vertically above the gaseous fuel injector 528 with respect to ground, and the gaseous fuel stream is directed upward towards the fan lighter 506 from the gaseous fuel injector 528. As discussed, the positioning of the fan lighter 506 relative to the gaseous fuel injector 528 supports the creation of a ghost flame effect.

The gaseous fuel injector 528 is configured to provide the gaseous fuel stream at greater than a threshold rate. In particular, it is noted that the gaseous fuel injector 528 may comprise an opening 530 for injecting the gaseous fuel stream 604. The opening 530 may be less than a threshold diameter in size (e.g., less than 4 mm or less than 3 mm in diameter). In at least one example, the opening 530 may be at least 1 mm in diameter. In one or more examples, there may only be a single opening 530 for injecting the gaseous fuel formed into the gaseous fuel injector 528. Alternatively, there may be multiple openings for injecting the gaseous fuel formed into the gaseous fuel injector. It is noted that an example of the gaseous fuel injector 528 is provided at FIG. 7, where the opening 530 is more easily viewable. Moreover, as also seen at FIG. 7, there may be a gap 702 provided between the housing 402 and the gaseous fuel injector 528 for the assembled fire device. The gap 702 may be included for purposes of improved oxygen flow to assist with flame formation.

Due to the pressure of the fuel source and a sizing of the opening 530 for the gaseous fuel injector 528, the gaseous fuel stream 604 is injected at greater than the threshold rate. In at least one example, the fuel source may store the fuel at a pressure of approximately 100 psi to 200 psi. In one or more examples, the threshold rate may be a predetermined rate, and a size of the opening 530 (or openings) formed into the gaseous fuel injector 528 for injecting the gaseous fuel may be selected based on the threshold rate and the pressure of the fuel source. The pressure of the gaseous fuel source may additionally or alternatively be adjusted based on the predetermined rate.

The predetermined rate for the gaseous fuel stream 604 is a rate at which ignition of only a first portion (e.g., ignited portion 608) of the gaseous fuel stream results, while maintaining another portion (e.g., unignited portion 606) of the gaseous fuel stream unignited.

The inventors have surprisingly found that by providing the gaseous fuel at a sufficiently high rate, ignition is prevented from extending down the entire gaseous fuel stream 604. Thus, upon ignition of the gaseous fuel stream 604 via a pilot light such as fan lighter 506, a portion of the gaseous fuel stream (e.g., unignited portion 606) above the gaseous fuel injector 528 is maintained unignited. Since the unignited gaseous fuel is not visible, the incomplete ignition of the gaseous fuel stream 604 causes the ignited portion 608 of the gaseous fuel stream to appear as though it is floating above the gaseous fuel injector 528. Such a floating flame is referred to herein as a ghost flame or as having a ghost flame effect.

The ghost flame effect creates a dramatic and highly visible flame. Furthermore, in a case of operating a fire device in the audio mode disclosed herein, the ghost flame effect helps to create a more clearly pronounced visualization with the audio input compared to traditional ignition approaches.

The fan lighter 506 supports the creation of the ghost flame. For example, the plane of flames 602 produced by the fan lighter 506 helps to provide a more defined ignition point compared to traditional pilot lights, which often are a small flame positioned very close to the pilot gas outlet. Further, a positioning of the fan lighter 506 above the gaseous fuel injector 528 also supports the creation of the ghost flame. In one or more examples, the positioning of the plane of flames 602 produced by the fan lighter 506 may at least a predetermined distance vertically above the gaseous fuel injector 528. Thus, the fan lighter 506 is positioned above the gaseous fuel injector 528 accordingly to provide the plane of flames 602 at least the predetermined distance vertically above the gaseous fuel injector 528.

Figure 8A:
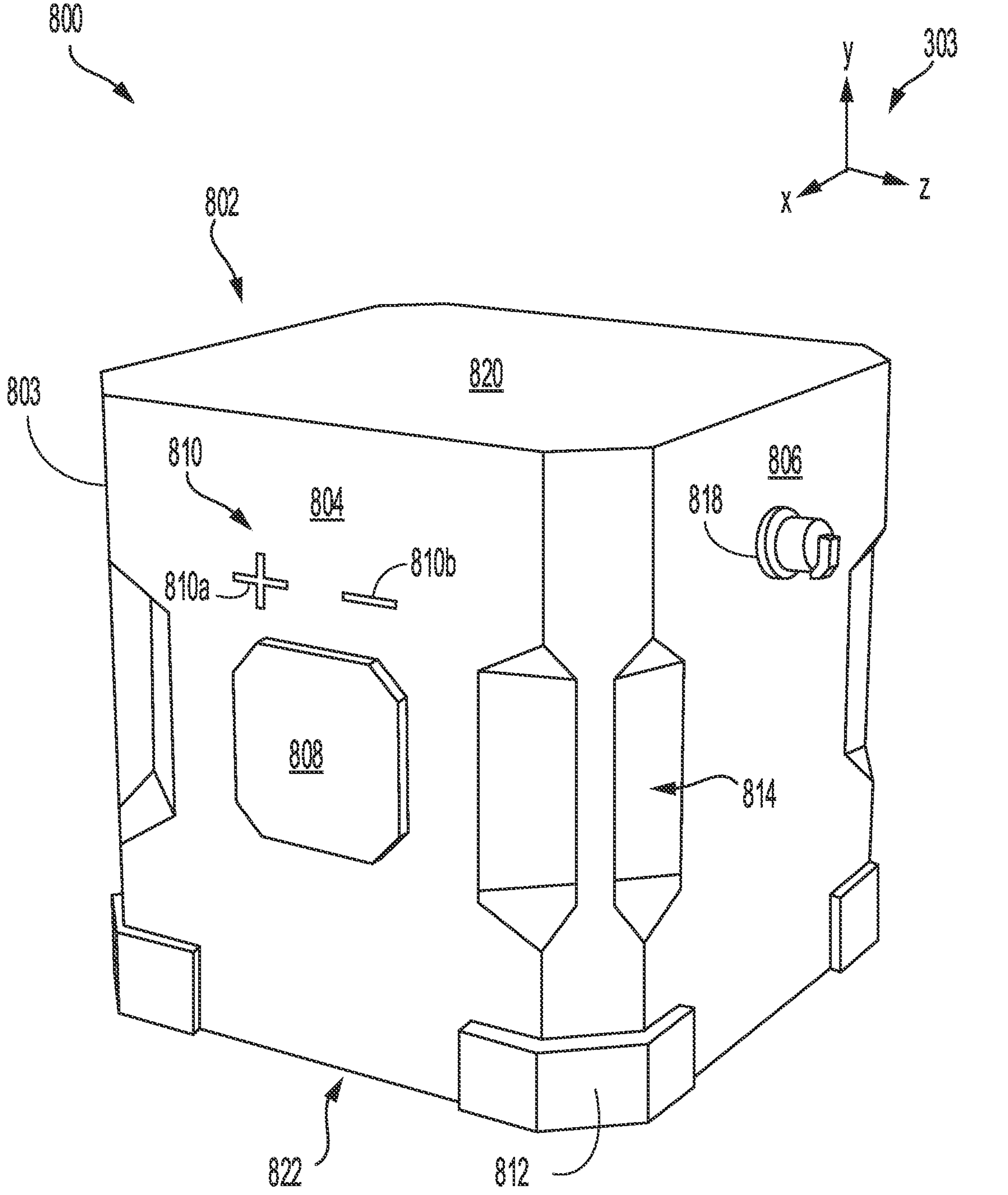
FIG. 8A shows a first view of a control hub, according to one or more examples of the present disclosure.
Figure 8B:
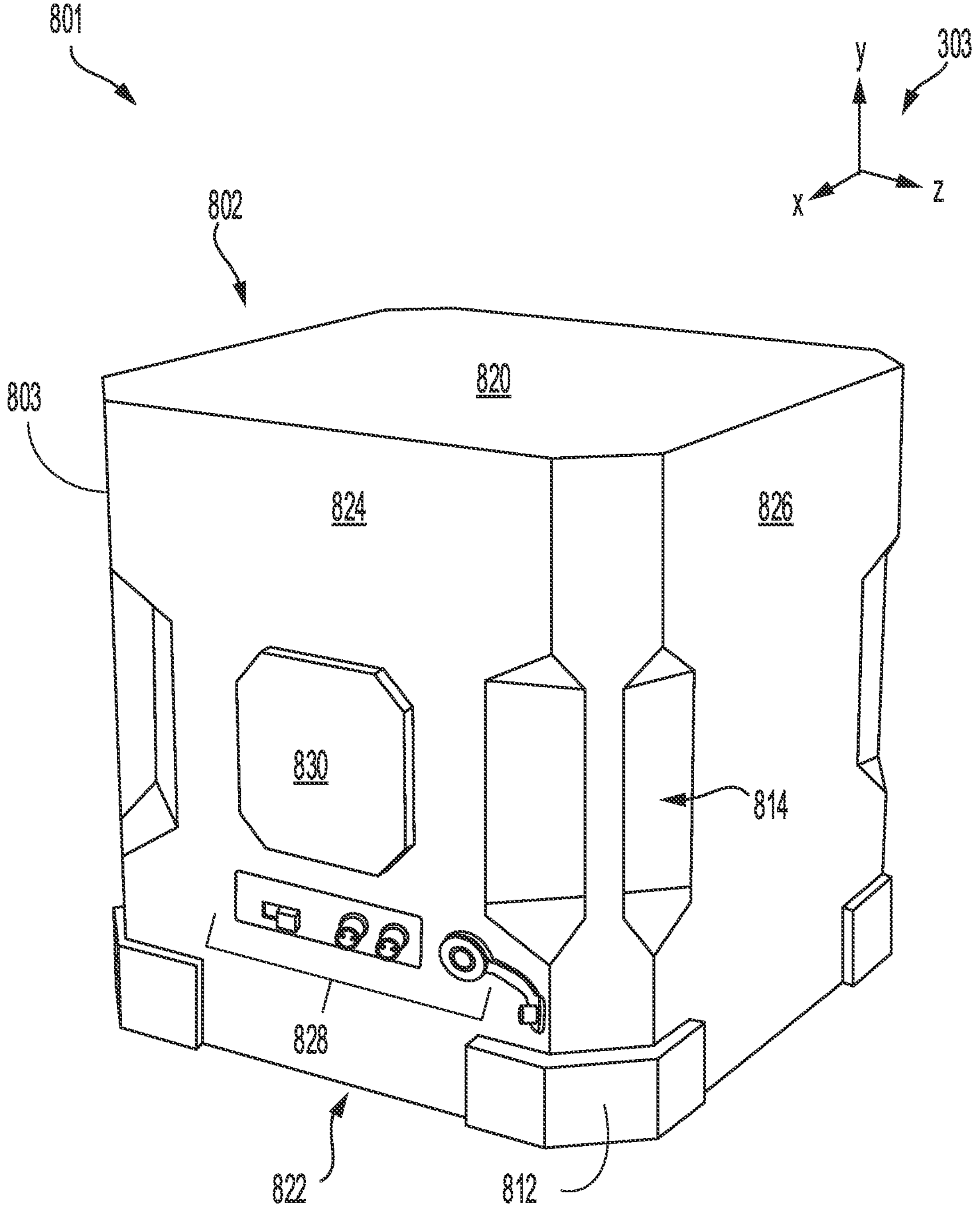
FIG. 8B shows a second view of the control hub, according to one or more examples of the present disclosure.

Turning now to FIG. 8A and FIG. 8B, FIG. 8A shows a first perspective view 800 of a control hub 802 and FIG. 8B shows a second perspective view 801 of the control hub 802, according to one or more examples of the present disclosure. The control hub shown in FIGS. 8A-8B may comprise any one or more control hub features described herein, such as in relation to control hub 110. In at least one example, the control hub may correspond to the control hub 110 shown in FIG. 2A.

As can be seen in FIG. 8A, the control hub 802 comprises a housing 803 with a substantially rounded cuboid shape, though other shapes are possible without departing from the scope of the disclosure. Further, though various dimensions are possible, in at least one example the control hub 802 may have a rounded cube shape with approximately 13"×13"×13" dimensions. The housing 803 may be a waterproof housing. In at least one example, the housing 803 of the control hub 802 may comprise a silicone skin over a plastic shell. Moreover, in one or more examples the housing 803 of the control hub 802 may be at least semi-transparent and include lighting positioned therein to provide a glowing effect for the control hub 802.

The first view 800 of the control hub 802 shows a first side 804 and a second side 806 of the control hub 802, where the second side 806 is adjacent to the first side 804 of the control hub 802. The first side 804 of the control hub 802 includes a speaker 808 and a user input device 810. The user input device 810 may be a volume control that comprises multiple buttons 810*a*, 810*b*. For example, 810*a* may be a volume increase button and 810*b* may be a volume decrease button. The volume increase button 810*a* may be in the shape of a plus sign, while the volume decrease button 810*b* may be in the shape of a minus sign, for example. Thus, via the user input device 810, a volume output via the speaker 808 and any other speakers included in the hub 802 may be adjusted. For example, the buttons 810*a*, 810*b* may be a volume increase and a volume decrease button, respectively. However, it is noted that the control hub 802 may instead comprise another input receiving means, such as a touch screen or a dial, for example.

The control hub 802 further comprises guards 812, where the guards may help to protect the control hub 802 from degradation. The control hub 802 may further include one or more recessed features 814, which may assist with gripping of the control hub 802.

The second side 806 of the control hub 802 comprises a mode user input device 818, which may be used to select a mode of the hub 802, according to one or more examples. For example, the mode user input device 818 may be used to turn the control hub 802 on or off, as well as select an operational mode such as the audio mode or the traditional mode. A top side 820 of the hub 802 may be substantially flat. Furthermore, though not visible in FIG. 8A, a bottom side 822 of the hub 802 may comprise one or more feet. The feet may comprise rubber in at least one example.

Turning to FIG. 8B, FIG. 8B shows the second perspective view 801 of the hub 802. The second perspective view 801 shows a third side 824 and a fourth side 826 of the hub 802. In at least one example, the third side 824 may be positioned opposite the first side 804 of the control hub 802. The fourth side may thus be positioned between the third side 824 and the first side 804, when moving counterclockwise.

As seen in the second perspective view 801, the third side 824 includes a speaker 830 and ports 828, where the ports 828 are formed into the third side 824 for coupling fire devices (such as the torches described herein) to the hub 802. For example, the ports 828 may be shaped to receive the common line (e.g., common line 202) described at FIG. 2A. The ports 828 may include waterproof connections for receiving the common line. Thus, the ports 828 may communicatively connect the hub 802 to the fire devices, so that the hub 802 is able to provide control signals to the fire devices. Furthermore, the ports 828 may include a phone port, such as a USB port for charging a mobile device, as well as a charging port for charging a battery of the hub 802.

The third side 824 further includes an audio input port 832 for receiving an audio input. The audio input port 820 may be an aux input, for example, though other possible audio input ports are possible without departing from the scope of this disclosure. For example, as detailed at FIG. 9, the audio input may be received wirelessly via a wireless receiver housed inside of the hub 802. The third side 824 of the hub 802 further includes a charging port 834, where the charging port 834 may be used for providing power for the hub 802 and/or charging a battery 914 on-board the hub 802, where battery 914 is shown at FIG. 9.

Figure 9:
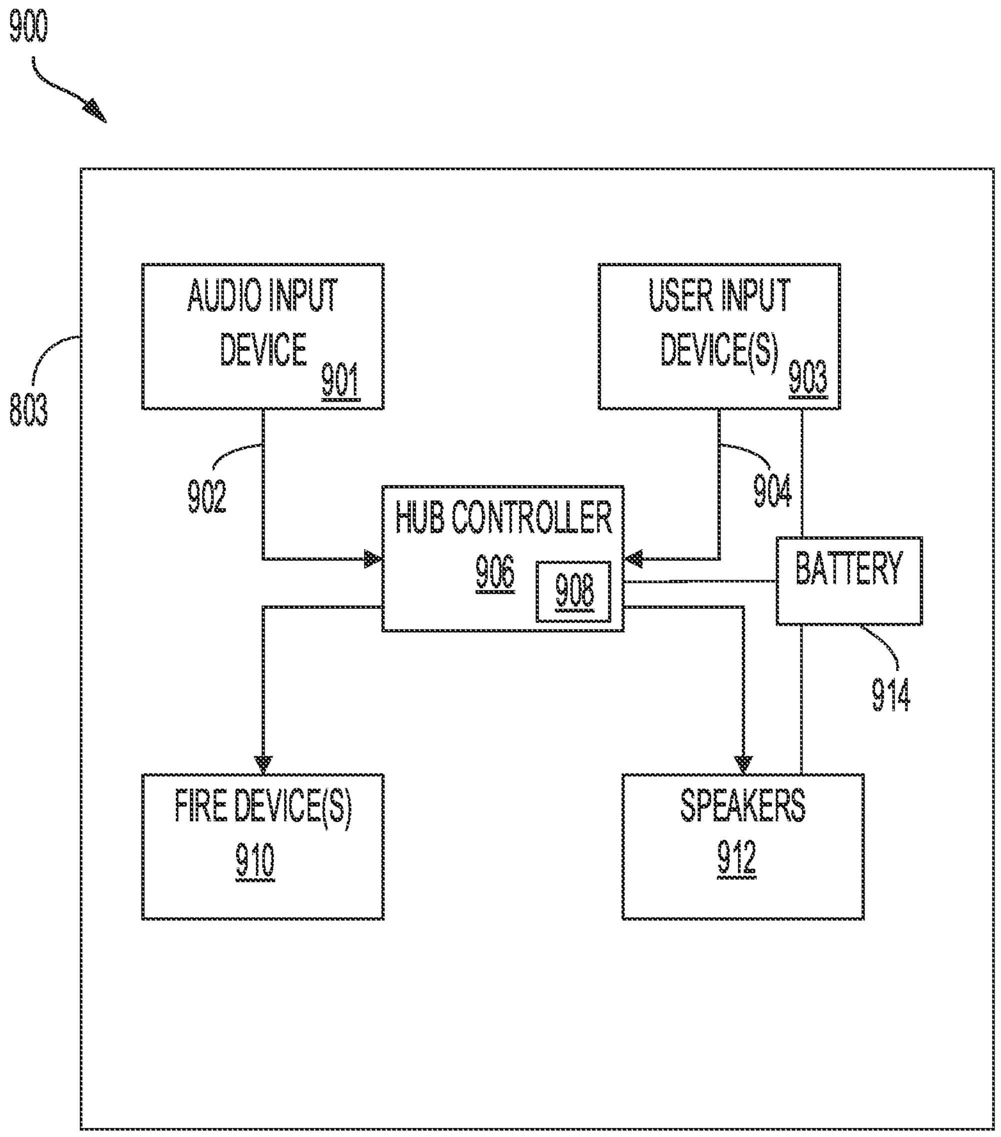
FIG. 9 is a schematic diagram of the control hub, according to one or more examples of the present disclosure.

Turning now to FIG. 9, FIG. 9 shows an example block diagram of a hub controller configuration 900. As seen in FIG. 9, the hub controller 906 is configured to receive an audio input 902 via an audio input device 901 and a user input 904 via a user input device 903. For example, the hub controller 906 may comprise a wireless receiver 908 for receiving one or more of the audio input 902 and the user input 904 in wireless form (e.g., short range RF). Additionally or alternatively, the hub controller 906 may be configured to receive one or more of the audio input 902 and the user input 904 via a wired connection.

The audio input device 901 may be a user device, such as a mobile device or personal computing device. Thus, in examples where the hub controller 906 receives the audio input 902 wirelessly, the audio input 902 may be streamed from the user device to the wireless receiver 908 of the hub controller 906. In examples where the audio input 902 is received from the user device via a wired connection, it is noted that a wired connection may be provided between the user device and the hub controller 906. For example, the wired connection may be provided via an aux input, though it is noted that other wired connection options are also possible.

The user input 904 may be received via one or more user input devices 903 of the hub (e.g., user input device 810, mode user input device 818). The user input 904 may be a signal provided to the hub controller 906 indicating one or more of a requested volume adjustment and a requested mode for the hub. The requested mode may include any of the modes discussed herein, such as the audio mode, the traditional mode, the flame boost mode, and the off mode, for example.

The hub controller 906 comprises instructions stored in non-transitory memory that are executable to actuate various components responsive to receiving one or more of the audio input 902 and the user input 904. Thus, responsive to receiving one or more of the audio input 902 and the user input 904 at the hub controller 906, the hub controller 906 may output control signals to actuate one or more components, such as components included in one or more fire devices 910 and one or more speakers 912. The one or more fire devices 910 may include any of the torches and fire pits disclosed herein, for example. The one or more speakers 912 may include the speakers formed into the hub, in at least one example.

Responsive to the user input 904 comprising a request to increase or decrease a volume, the hub controller 906 may output a control signal to adjust a volume output of one or more of the speakers 912 (e.g., speaker 808, speaker 830) accordingly.

Responsive to the user input 904 comprising a request to operate in the traditional mode, the hub controller 906 may output a control signal to one or more of the fire devices 910 (e.g., torches 102, fire pits 104) to electrically actuate a valve (e.g., second valve 536) in each of the one or more fire devices accordingly. For example, the hub controller 906 may output the control signal to one or more of the fire devices 910 to actuate the electric valve (e.g., second valve 536) to a base set position for the traditional mode, as previously discussed herein. If the traditional mode is requested via the user input 904, it noted that the control signal output to one or more of the fire devices 910 is not based on the audio input 902, even if an audio input 902 is being received at the hub controller 906. Rather, in the traditional mode, the hub controller 906 outputs a control signal to one or more of the fire devices 910 to actuate the electric valve (e.g., second valve 536) to the base position for the traditional mode regardless of the audio input that may be received. However, in at least one example, it is noted that the hub controller 906 may output control signals to the speakers 912 based on receiving the audio input 902, even when in the traditional mode. That is, the audio input 902 may be provided via the speakers 912 of the hub in the traditional mode, though the audio input 902 is not being used to adjust a position of the electric valve (e.g., second valve 536).

Responsive to a user input 904 comprising a request to operate in the audio mode and the hub controller 906 receiving an audio input 902, the hub controller 906 may output a control signal to one or more of the fire devices 910 to electrically actuate the valve (e.g., second valve 536) in each of the one or more fire devices, where the control signal is based on the audio input 902 received.

For example, the audio input 902 may be a music input, and the hub controller 906 may output a control signal based on the audio input 902 to adjust the valve position (e.g., second valve 536) and coordinate the flame height and size of fire devices in a fire display to the audio input 902. In this way, the position of the valve may be varied in the audio mode in a manner coordinated with the audio input 902.

In cases where the audio mode request is received at the hub controller 906 via the user input 904 but an audio input 902 is not being received at the hub controller 906, the hub controller 906 may output a control signal to one or more of the fire devices 910 to actuate the valve (e.g., second valve 536) in each of the one or more fire devices to an audio mode base position. The audio mode base position may be a same or different position than the traditional mode position. In at least one example, the audio mode base position may be an at least partially open position that is less than the wide open position for the valve.

In one or more examples, the hub controller 906 may be coupled to the one or more fire devices via the common line (e.g., common line 202) as described herein, where the common line is coupled to the hub via one or more of the ports 828. In such examples where the hub controller 906 is coupled to the one or more fire devices via the common line, it is noted that the control signal output from the hub controller 906 to the common line is provided to all of the fire devices coupled to the common line (e.g., via wire connection clamps 204 and input lines 208*a*, 208*b*).

In at least one example, the hub may further comprise a battery 914. The battery 914 may provide a power supply to one or more of the hub controller 906, the user input device(s) 903, and speakers 912 of the hub. The battery 914 may further provide a power supply to charge a user mobile device via a USB port. In at least one example, the battery 914 may be a 9800 mAh battery that is chargeable via a charging port, as previously described.

In this way, a fire display may be coordinated in a simple manner. It is noted that reference to signals, such as input signals, output signals, and control signals, refer to electric signals, in at least one example.

Turning to FIG. 10, FIG. 10 shows a flow chart 1000 of a method for operating a fire display, according to one or more examples of the present disclosure. Method 1000 may be executable instructions included in the non-transitory memory of a hub, such as one of the example hubs disclosed herein.

Method 1000 may comprise step 1002, which includes determining whether a user input (e.g., user input 904) has been received at the hub controller (e.g., hub controller 906). If no user input has been received at the hub ("NO"), then method 1000 proceeds to maintain a current operational mode at step 1004.

If a user input (e.g., user input 904) has been received at the hub controller, then method 1000 includes determining whether the user input is a request for the traditional mode at step 1006. In a case where it is determined that the traditional mode has been requested ("YES") at step 1006, method 1000 includes adjusting a valve (e.g., second valve 536) included in each of one or more fire devices of a fire display, respectively, to a base set position at step 1008. The base set position is set via the hub controller based on a predetermined position of the valve for the traditional mode. The valve position may then be maintained at the base position at step 1010. For example, the valve position may then be maintained for a duration of the traditional mode. It is noted that the valve may be adjusted via a control signal output through a common line (e.g., common line 202), where the one or more fire devices are coupled to the common line. The one or more fire devices may include fire devices with an ignition configuration as discussed at FIGS. 5-7. Thus, step 1008 and 1010 may comprise providing a ghost flame effect as discussed in conjunction with FIGS. 5-7. It is noted that the base position set at step 1008 in the traditional mode may be maintained at step 1010 regardless of any audio input that may be received. Moreover, any one or combination of the details described herein with respect to the traditional mode may apply to the traditional mode adjustments made at step 1008. Following step 1010, method 1000 may proceed to step 1020, where step 1020 is described below.

If the traditional mode has not been selected ("NO") at step 1006, method 1000 includes determining whether the user input is a request for the audio mode at step 1012. In a case where it is determined that the audio mode has been requested ("YES") at step 1012, method 1000 further includes determining whether an audio input (e.g., audio input 902) has been received at step 1014.

In examples where both the audio mode has been requested ("YES") at step 1012 and an audio input has been received ("YES") at step 1014, then method 1000 includes actuating the valve (e.g., second valve 536) included in each of the one or more fire devices of the fire display, respectively, based on the audio input at step 1016. A position of the valve (e.g., second valve 536) respectively included in each of the one or more fire devices of the fire display is continually adjusted based on the audio input at step 1016, following step 1014.

In examples where the audio mode has been requested ("YES") at step 1012 and an audio input has not been received ("NO") at step 1014, then method 1000 includes controlling the valve (e.g., second valve 536) included in each of the one or more fire devices in the fire display, respectively, based on an audio base set position at step 1018. Controlling the valve in the one or more fire devices based on the audio base position at step 1018 may include maintaining the valves at their current set positions.

The audio base set position may be the same or a different position than the base position set in the traditional mode. In at least one example, the audio base set position may be at least partially open and less than a wide open position. Any one or combination of the details described herein with respect to the audio mode may apply to the audio mode adjustments made at steps 1016 and 1018. Furthermore, the one or more fire devices controlled at steps 1016 and 1018 may include fire devices with an ignition configuration as discussed at FIGS. 5-7. Thus, steps 1008, 1010, 1016, and 1018 may comprise providing a ghost flame effect as discussed in conjunction with FIGS. 5-7.

If it is determined that the audio mode has not been requested ("NO") at step 1012, then method 1000 includes determining whether a volume adjustment is requested at step 1020. If a volume adjustment is not requested ("NO"), then method 1000 may end.

If a volume adjustment is requested ("YES") at step 1020, then method 1000 may include actuating one or more speakers to increase or decrease a volume based on the volume adjustment request at step 1022. Method 1000 may then end.

Thus, provided herein is a torch and system that uses an electronic valve and a wired in or wireless signal produced from a hub to run numerous audio torches. Used both for commercial and residential.

In some embodiments, the audio torch system can be portable and built into other apparatus as an added feature above and beyond its single use. The torch system can have multiple functions and modes of operation.

Traditional torch mode: where the torch flame is always on

Audio torch mode: where the torch responds to a signal from a hub either wired or wireless.

In some embodiments, the Hub can also be a speaker or part of a speaker system that can be added to a home or business existing audio system.

In at least one embodiment, the torch has a tip sensor to shut flame off if the torch were to fall over. The torch can have a multi-channel gas control valve like valves found in outdoor umbrella heaters. The torch may be controlled all together (as a group) or individually using an analog or digital control board.

In some embodiments, an app (application software program) can be used to control each individual Torch for a more customized fire show. The "flame always on" function, also referred to as the traditional mode, can be controlled by constant electrical current supplied to the electric valves contained in the torch. The current will open the valves to its max flow rate and provide a traditional torch setting.

In some embodiments, a feature control system can be controlled by Voice command, app, push button or digital LCD or similar screen. The torch will have a pilot flame to keep the torch lit when desired. The torch will have an ignitor built in to ignite the flame. The torch can use a wide range of gas supply pressures. The torch can have a wind screen to help keep the flame ignited. The torch can vary in shape and design. The torches can be combined with other torches. The system can have a signal booster to add additional torches if desired. The hub, torches, signal booster, quick connect wire connections, multi-link wireless connection hub, wire, can all be sold separately and not as one package. The torches can be linked together with other products. The torch system can be powered by battery power or wall power. The torches can have batteries contained for extra features. The torches can have built in audio. The torches can be used as portable speakers. The torch system can have speakers purchased as an accessory to add to the torch system to create sound throughout the area the torch system is being used. Other features and details are as illustrated, for example.

The disclosure also provides support for a method for control of a fire device system, comprising: receiving a user input selecting an audio mode, receiving an audio input, and actuating a respective valve included in each of a plurality of torches based on the audio mode selection and the audio input via a control signal sent through a common line, wherein each of the plurality of torches comprises a wire connection clamp coupling a respective torch of the plurality of torches to the common line to receive the control signal. In a first example of the method, the respective valve is part of an ignition configuration, and wherein the respective valve adjusts an amount of gaseous fuel supplied to a gaseous fuel injector. In a second example of the method, optionally including the first example, the gaseous fuel supplied to the gaseous fuel injector is injected by the gaseous fuel injector as a gaseous fuel stream, and wherein the ignition configuration includes a fan lighter positioned vertically above the gaseous fuel injector. In a third example of the method, optionally including one or both of the first and second examples, the fan lighter ignites only a first portion of the gaseous fuel stream injected by the gaseous fuel injector, and wherein a second portion of the gaseous fuel stream is maintained unignited, the second portion extending from the gaseous fuel injector to the first portion of the gaseous fuel stream. In a fourth example of the method, optionally including one or more or each of the first through third examples, the gaseous fuel injector is configured to provide the gaseous fuel stream at greater than a threshold rate. In a fifth example of the method, optionally including one or more or each of the first through fourth examples, the method further comprises: receiving another user input selecting a traditional mode, responsive to receiving the selection of the traditional mode, actuating the respective valve included in each of the plurality of torches to a set base position via a traditional mode control signal sent through the common line, and maintaining the set base position for a duration of the traditional mode, wherein the traditional mode control signal is not based on the audio input. In a sixth example of the method, optionally including one or more or each of the first through fifth examples, the traditional mode control signal is not based on the audio input, even when the audio input is being received. In a seventh example of the method, optionally including one or more or each of the first through sixth examples, a hub provides the control signal via the common line. In a eighth example of the method, optionally including one or more or each of the first through seventh examples, there are further one or more fire pits with a respective fire pit valve positioned therein that is actuated based on the audio mode.

The disclosure also provides support for a fire device system, comprising: a plurality of torches, wherein each of the plurality of torches includes an ignition configuration comprising a valve and a fan lighter, the valve configured to adjust an amount of fuel flowed to a gaseous fuel injector and the fan lighter positioned vertically above the gaseous fuel injector, a common line, wherein each of the plurality of torches is coupled to the common line via a wire connection clamp, and a hub communicatively coupled to the plurality of torches via the common line, wherein the hub comprises a controller with instructions stored in non-transitory memory executable to: provide a control signal via the common line to actuate the valve included in each of the respective plurality of torches based on an audio mode request and an audio input. In a first example of the system, the gaseous fuel injector comprises an opening that is less than a threshold diameter, and wherein the fuel is a gaseous fuel that is injected via the opening of the gaseous fuel injector as a gaseous fuel stream. In a second example of the system, optionally including the first example, the fan lighter is configured to provide a plane of flames as a pilot light, wherein the plane of flames intersects with the gaseous fuel stream. In a third example of the system, optionally including one or both of the first and second examples, actuating the valve includes continually adjusting a position of the valve based on the audio input while in the audio mode. In a fourth example of the system, optionally including one or more or each of the first through third examples, the system further comprises: instructions executable to: provide a traditional mode control signal via the common line to actuate the valve included in each of the respective plurality of torches to a set base position, where the valve included in each of the respective plurality of torches is maintained in the set base position while in the traditional mode.

The disclosure also provides support for a fire device, comprising: a fan lighter, a pilot light gas tube and a pilot light positioned adjacent to the fan lighter, a gaseous fuel injector, wherein the fan lighter is positioned vertically above the gaseous fuel injector, the gaseous fuel injector vertically spaced away from the fan lighter, a valve positioned upstream of the gaseous fuel injector, the valve configured to provide gaseous fuel to the gaseous fuel injector, and a hub communicatively coupled to a fire device controller, the hub comprising instructions stored in non-transitory memory executable to: adjust a position of the valve responsive to receiving a request for an audio mode and receiving an audio input, where the position of the valve is based on the audio input. In a first example of the system, the fan lighter comprises a plurality of openings arranged along a direction substantially perpendicular to a longitudinal axis of the fire device. In a second example of the system, optionally including the first example, the position of the valve is varied throughout a duration of the audio mode based on the audio input. In a third example of the system, optionally including one or both of the first and second examples, the instructions are further executable to adjust the position of the valve to a base set position responsive to receiving a request for a traditional mode, wherein the position of the valve is maintained at the set base position throughout a duration of the traditional mode. In a fourth example of the system, optionally including one or more or each of the first through third examples, the gaseous fuel injector is configured to inject a gaseous fuel stream at greater than a threshold rate towards the fan lighter. In a fifth example of the system, optionally including one or more or each of the first through fourth examples, the fan lighter is configured to provide a plane of flames that intersects with the gaseous fuel stream at least a threshold distance above the gaseous fuel injector.

FIGS. 3A-8B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the control system, where the described actions are carried out by executing the instructions in a system including the various hardware components in combination with the hub controller and/or the fire device controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for control of a fire device system, comprising:
- receiving a user input selecting an audio mode;
- receiving an audio input; and
- actuating a respective valve included in each of a plurality of torches based on the audio mode selection and the audio input via a control signal sent through a common line, wherein each of the plurality of torches comprises a wire connection clamp coupling a respective torch of the plurality of torches to the common line to receive the control signal.

2. The method of claim 1, wherein the respective valve is part of an ignition configuration, and wherein the respective valve adjusts an amount of gaseous fuel supplied to a gaseous fuel injector.

3. The method of claim 2, wherein the gaseous fuel supplied to the gaseous fuel injector is injected by the gaseous fuel injector as a gaseous fuel stream, and wherein the ignition configuration includes a fan lighter positioned vertically above the gaseous fuel injector.

4. The method of claim 3, wherein the fan lighter ignites only a first portion of the gaseous fuel stream injected by the gaseous fuel injector, and wherein a second portion of the gaseous fuel stream is maintained unignited, the second portion extending from the gaseous fuel injector to the first portion of the gaseous fuel stream.

5. The method of claim 3, wherein the gaseous fuel injector is configured to provide the gaseous fuel stream at greater than a threshold rate.

6. The method of claim 1, further comprising:

receiving another user input selecting a traditional mode;

responsive to receiving the selection of the traditional mode, actuating the respective valve included in each of the plurality of torches to a set base position via a traditional mode control signal sent through the common line; and maintaining the set base position for a duration of the traditional mode, wherein the traditional mode control signal is not based on the audio input.

7. The method of claim 6, wherein the traditional mode control signal is not based on the audio input, even when the audio input is being received.

8. The method of claim 1, wherein a hub provides the control signal via the common line.

9. The method of claim 1, wherein there are further one or more fire pits with a respective fire pit valve positioned therein that is actuated based on the audio mode.

10. A fire device system, comprising:

a plurality of torches, wherein each of the plurality of torches includes an ignition configuration comprising a valve and a fan lighter, the valve configured to adjust an amount of fuel flowed to a gaseous fuel injector and the fan lighter positioned vertically above the gaseous fuel injector;

a common line, wherein each of the plurality of torches is coupled to the common line via a wire connection clamp; and a hub communicatively coupled to the plurality of torches via the common line, wherein the hub comprises a controller with instructions stored in non-transitory memory, wherein the instructions, when executed by the controller, cause the controller to:

provide a control signal via the common line to actuate the valve included in each of the respective plurality of torches based on an audio mode request and an audio input.

11. The fire device system of claim 10, wherein the gaseous fuel injector comprises an opening that is less than a threshold diameter, and wherein the fuel is a gaseous fuel that is injected via the opening of the gaseous fuel injector as a gaseous fuel stream.

12. The fire device system of claim 11, wherein the fan lighter is configured to provide a plane of flames as a pilot light, wherein the plane of flames intersects with the gaseous fuel stream.

13. The fire device system of claim 10, wherein the controller is configured to actuate the valve by continually adjusting a position of the valve based on the audio input while in the audio mode.

14. The fire device system of claim 10, further comprising instructions executable to:

provide a traditional mode control signal via the common line to actuate the respective valve included in each of the plurality of torches to a set base position, where the respective valve included in each of the plurality of torches is maintained in the set base position while in the traditional mode.

15. A fire device, comprising:

a fan lighter;

a pilot light gas tube and a pilot light positioned adjacent to the fan lighter;

a gaseous fuel injector, wherein the fan lighter is positioned vertically above the gaseous fuel injector, the gaseous fuel injector vertically spaced away from the fan lighter;

a valve positioned upstream of the gaseous fuel injector, the valve configured to provide gaseous fuel to the gaseous fuel injector; and a hub communicatively coupled to a fire device controller, the hub comprising instructions stored in non-transitory memory, wherein the instructions, when executed by the fire device controller, cause the fire device controller to:

adjust a position of the valve responsive to receiving a request for an audio mode and receiving an audio input, where the position of the valve is based on the audio input.

16. The fire device of claim 15, wherein the fan lighter comprises a plurality of openings arranged along a direction substantially perpendicular to a longitudinal axis of the fire device.

17. The fire device of claim 15, wherein the position of the valve is varied throughout a duration of the audio mode based on the audio input.

18. The fire device of claim 15, wherein the hub is configured to adjust the position of the valve to a base set position responsive to receiving a request for a traditional mode, wherein the position of the valve is maintained at the base set position throughout a duration of the traditional mode.

19. The fire device of claim 15, wherein the gaseous fuel injector is configured to inject a gaseous fuel stream at a rate greater than a threshold rate towards the fan lighter.

20. The fire device of claim 19, wherein the fan lighter is configured to provide a plane of flames that intersects with the gaseous fuel stream at least a threshold distance above the gaseous fuel injector.

* * * * *